United States Patent
Aoto

(10) Patent No.: US 12,308,176 B2
(45) Date of Patent: May 20, 2025

(54) MULTILAYER CERAMIC CAPACITOR

(71) Applicant: Murata Manufacturing Co., Ltd., Nagaokakyo (JP)

(72) Inventor: Shogo Aoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 156 days.

(21) Appl. No.: 18/117,497

(22) Filed: Mar. 6, 2023

(65) Prior Publication Data

US 2023/0290575 A1 Sep. 14, 2023

(30) Foreign Application Priority Data

Mar. 10, 2022 (JP) .................. 2022-037382

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC .......... H01G 4/30; H01G 4/008; H01G 4/012; H01G 4/1227; H01G 4/224; H01G 4/0085; H01G 4/1209; H01G 4/1218; H01G 4/12; H01G 4/232; H01G 4/2325
See application file for complete search history.

(56) References Cited

U.S. PATENT DOCUMENTS

| | | | | |
|---|---|---|---|---|
| 11,476,053 B2* | 10/2022 | Nishikawa | ............. | H01G 13/00 |
| 11,705,278 B2* | 7/2023 | Matsushita | ............. | H01G 4/30 |
| | | | | 361/301.4 |
| 2014/0311789 A1* | 10/2014 | Han | ............. | H01G 4/12 |
| | | | | 361/301.4 |
| 2021/0280374 A1* | 9/2021 | Nishikawa | ............. | H05K 1/181 |
| 2021/0335542 A1* | 10/2021 | Matsushita | ............. | H01G 2/065 |
| 2022/0068560 A1* | 3/2022 | Sasaki | ............. | H01G 4/1209 |
| 2023/0290575 A1* | 9/2023 | Aoto | ............. | H01G 4/2325 |

FOREIGN PATENT DOCUMENTS

| | | | |
|---|---|---|---|
| JP | 2000-049032 A | | 2/2000 |
| JP | 2021027284 A | * | 2/2021 |
| JP | 2021114570 A | * | 8/2021 |
| KR | 20220117822 A | * | 8/2022 |

* cited by examiner

Primary Examiner — Dion R. Ferguson
(74) Attorney, Agent, or Firm — Keating & Bennett, LLP

(57) ABSTRACT

A multilayer ceramic capacitor includes, on a first end surface, first protruding portions opposed to each other and extending along at least two surfaces of a first main surface and a second main surface or a first lateral surface and a second lateral surface and, on a second end surface, second protruding portions opposed to each other and extending along at least two surfaces of a first main surface and a second main surface or a first lateral surface and a second lateral surface. The first and second protruding portions do not overlap the inner layer portion.

19 Claims, 19 Drawing Sheets

X – X CROSS SECTION

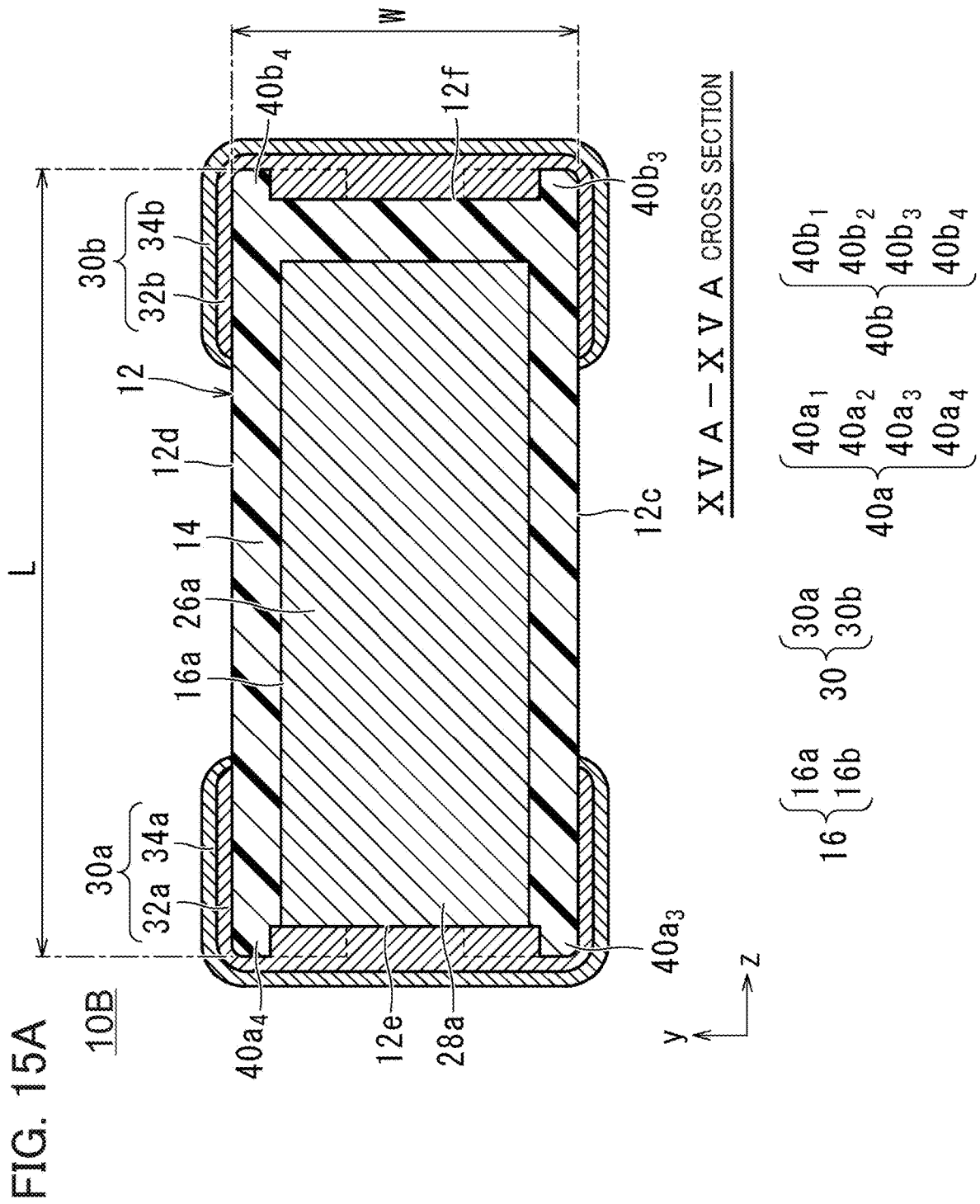

XVI – XVI CROSS SECTION

MULTILAYER CERAMIC CAPACITOR

CROSS REFERENCE TO RELATED APPLICATIONS

This application claims the benefit of priority to Japanese Patent Application No. 2022-037382 filed on Mar. 10, 2022. The entire contents of this application are hereby incorporated herein by reference.

BACKGROUND OF THE INVENTION

1. Field of the Invention

The present invention relates to a multilayer ceramic capacitor.

2. Description of the Related Art

In recent years, in multilayer ceramic electronic components such as multilayer ceramic capacitors, the sizes of the electronic components have been further reduced. Therefore, the ceramic sintered bodies (multilayer bodies) have become smaller. When the ceramic sintered bodies become smaller, the weights of the ceramic sintered bodies become lighter. As a result, when a multilayer ceramic electronic component is mounted on an electrode land on a printed circuit board using solder, the tombstone phenomenon or the Manhattan phenomenon is likely to occur in which the ceramic sintered body tends to rise due to the surface tension of the solder since, when the weight of the ceramic sintered body is reduced, the ceramic sintered body is shrunk during the solidification of the solder. Furthermore, when the end surface of the ceramic sintered body is flat, a dipping method is used in which the end surface of the ceramic sintered body is immersed in an electrically conductive paste, and then the end surface of the ceramic sintered body is pulled up from the electrically conductive paste. In a case in which the external electrode is formed on the end surface of the ceramic sintered body by the dipping method, when the end surface of the ceramic sintered body is pulled up from the electrically conductive paste, the electrically conductive paste collects at the central portion of the end surface of the ceramic sintered body due to gravity and surface tension of the electrically conductive paste. As a result, the thickness of the electrically conductive paste at the four corners of the end surface of the ceramic sintered body becomes smaller than that at the central portion of the end surface of the ceramic sintered body. In such a case, since the outer surface of the external electrode is not flat, the shrinkage during solidification of the solder causes tensile stress to act on four corners of the end surface of the ceramic sintered body, a result of which it is more likely that one end surface of the ceramic sintered body rises to cause the tombstone phenomenon.

For example, Japanese Unexamined Patent Application Publication No. 2000-49032 addresses the above situation. Japanese Unexamined Patent Application Publication No. 2000-49032 discloses a configuration including a ceramic sintered body, a plurality of internal electrodes that overlap each other in a thickness direction with a ceramic layer interposed therebetween in the ceramic sintered body, and a first external electrode and a second external electrode provided on first and second opposed end surfaces of the ceramic sintered body, respectively, and electrically connected to any of the internal electrodes, in which the first end surface and the second end surface of the ceramic sintered body each include a recessed surface recessed at an intermediate height position. Since the outer surfaces of the external electrodes are flattened by making the first and second end surfaces recessed as in the above configuration, the occurrence of the tombstone phenomenon can be reduced or prevented.

However, in Japanese Unexamined Patent Application Publication No. 2000-49032, moisture resistance may decrease and deteriorate. That is, in Japanese Unexamined Patent Application Publication No. 2000-49032, the external electrodes are formed on the ceramic sintered body having the recessed end surfaces by a dipping method. In this case, the end surface of the ceramic sintered body is immersed in the electrically conductive paste, held for a certain time, and then the end surface of the ceramic sintered body is pulled up from the electrically conductive paste to adhere the electrically conductive paste so as to cover the end surface of the ceramic sintered body. Then, the electrically conductive paste is fired to form external electrodes. At this time, when the end surface of the ceramic sintered body is pulled up from the electrically conductive paste, the electrically conductive paste collects at the central portion of the end surface of the ceramic sintered body due to the surface tension and the gravity of the electrically conductive paste. As a result, the external electrodes at the four corners of the end surface of the ceramic sintered body are thinner than the external electrodes at the central portion of the end surface of the ceramic sintered body. At this time, when the plated layer is formed on the external electrode, the plating solution is likely to penetrate from the portions of the four corners of the end surface of the ceramic sintered body where the thickness of the external electrode is thin. In the configuration of Japanese Unexamined Patent Application Publication No. 2000-49032, moisture resistance decreases when the plating solution penetrates.

SUMMARY OF THE INVENTION

Preferred embodiments of the present invention provide multilayer ceramic capacitors that are each improve moisture resistance while reducing or preventing the tombstone phenomenon.

A preferred embodiment of the present application provides a multilayer ceramic capacitor including a multilayer body including a plurality of laminated dielectric layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of first internal electrode layers on the plurality of dielectric layers and each exposed at the first end surface, and a plurality of second internal electrode layers on the plurality of dielectric layers and each exposed at the second end surface, a first external electrode including a base electrode layer on the first end surface and a plated layer on the base electrode layer, and a second external electrode including a base electrode layer on the second end surface and a plated layer on the base electrode layer, wherein the multilayer body includes an inner layer portion in which the plurality of first internal electrode layers and the plurality of second internal electrode layers are opposed to each other, a first main surface-side outer layer portion adjacent to the first main surface and including the plurality of dielectric layers located between the first main surface, and an outermost surface of the inner layer portion adjacent to the first main surface and an extension line of the outermost surface, a second main surface-side outer layer portion adjacent to the second main surface and including the plurality of dielectric layers located between the second main surface, and an outermost surface of the inner layer portion adjacent to the second main surface and an extension line of the outermost surface, a first lateral surface-side outer layer portion adjacent to the first lateral surface and including the plurality of dielectric layers located between the first lateral surface and an outermost surface of the inner layer portion adjacent to the first lateral surface, and a second lateral surface-side outer layer portion adjacent to the second lateral surface and including the plurality of dielectric layers located between the second lateral surface and an outermost surface of the inner layer portion adjacent to the second lateral surface, wherein, on the first end surface, first protruding portions are opposed to each other and extend along at least two surfaces of the first main surface and the second main surface or the first lateral surface and the second lateral surface at portions where the first main surface-side outer layer portion and the second main surface-side outer layer portion or the first lateral surface-side outer layer portion and the second lateral surface-side outer layer portion are located, on the second end surface, second protruding portions are opposed to each other and extend along at least two surfaces of the first main surface and the second main surface or the first lateral surface and the second lateral surface at portions where the first main surface-side outer layer portion and the second main surface-side outer layer portion or the first lateral surface-side outer layer portion and the second lateral surface-side outer layer portion are located, and the first protruding portions and the second protruding portions do not overlap the inner layer portion.

A preferred embodiment of the present invention provides a multilayer ceramic capacitor including a multilayer body including a plurality of laminated dielectric layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of first internal electrode layers on the plurality of dielectric layers and each exposed at the first end surface, and a plurality of second internal electrode layers on the plurality of dielectric layers and each exposed at the second end surface, a first external electrode including a base electrode layer on the first end surface and a plated layer on the base electrode layer, and a second external electrode including a base electrode layer on the second end surface and a plated layer on the base electrode layer, wherein the multilayer body includes an inner layer portion in which the plurality of first internal electrode layers and the plurality of second internal electrode layers are opposed to each other, a first main surface-side outer layer portion adjacent to the first main surface and including the plurality of dielectric layers located between the first main surface, and an outermost surface of the inner layer portion adjacent to the first main surface and an extension line of the outermost surface, a second main surface-side outer layer portion adjacent to the second main surface and including the plurality of dielectric layers located between the second main surface, and an outermost surface of the inner layer portion adjacent to the second main surface and an extension line of the outermost surface, a first lateral surface-side outer layer portion adjacent to the first lateral surface and including the plurality of dielectric layers located between the first lateral surface and an outermost surface of the inner layer portion adjacent to the first lateral surface, and a second lateral surface-side outer layer portion adjacent to the second lateral surface and includes the plurality of dielectric layers located between the second lateral surface and an outermost surface of the inner layer portion adjacent to the second lateral surface, wherein four first protruding portions located at four corners of the multilayer body are provided on the first end surface, four second protruding portions located at four corners of the multilayer body are provided on the second end surface, and the first protruding portions and the second protruding portions do not overlap the inner layer portion.

According to preferred embodiments of the present invention, it is possible to provide multilayer ceramic capacitors that are each improve moisture resistance while reducing or preventing the tombstone phenomenon.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15A is a cross-sectional view taken along the line XVA-XVA of FIG. 13A.

DETAILED DESCRIPTION OF THE PREFERRED EMBODIMENTS

First Preferred Embodiment 1-1. Multilayer Ceramic Capacitor

Figure 1:
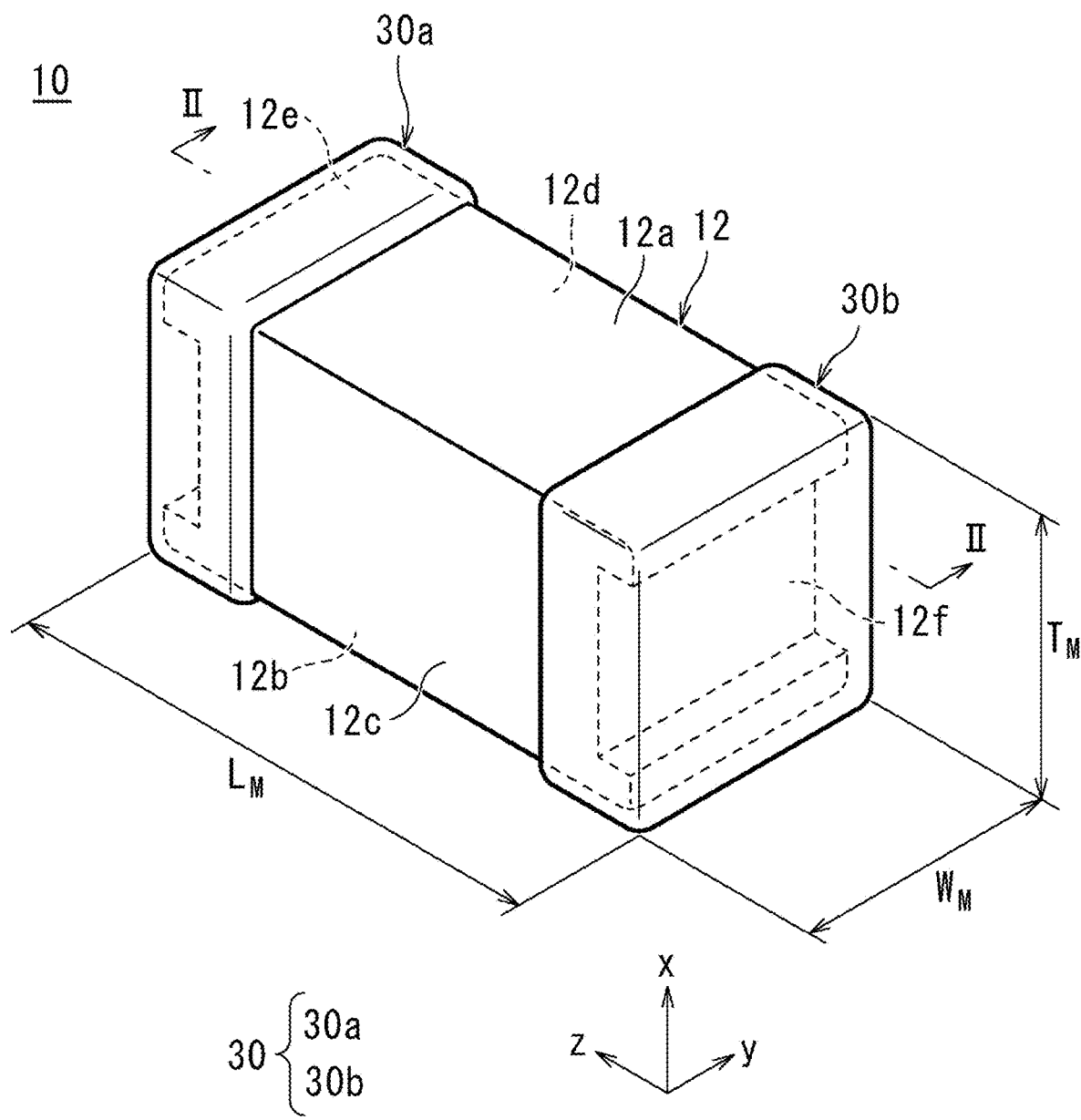
FIG. 1 is an external perspective view of an example of a multilayer ceramic capacitor according to a first preferred embodiment of the present invention.
Figure 2:
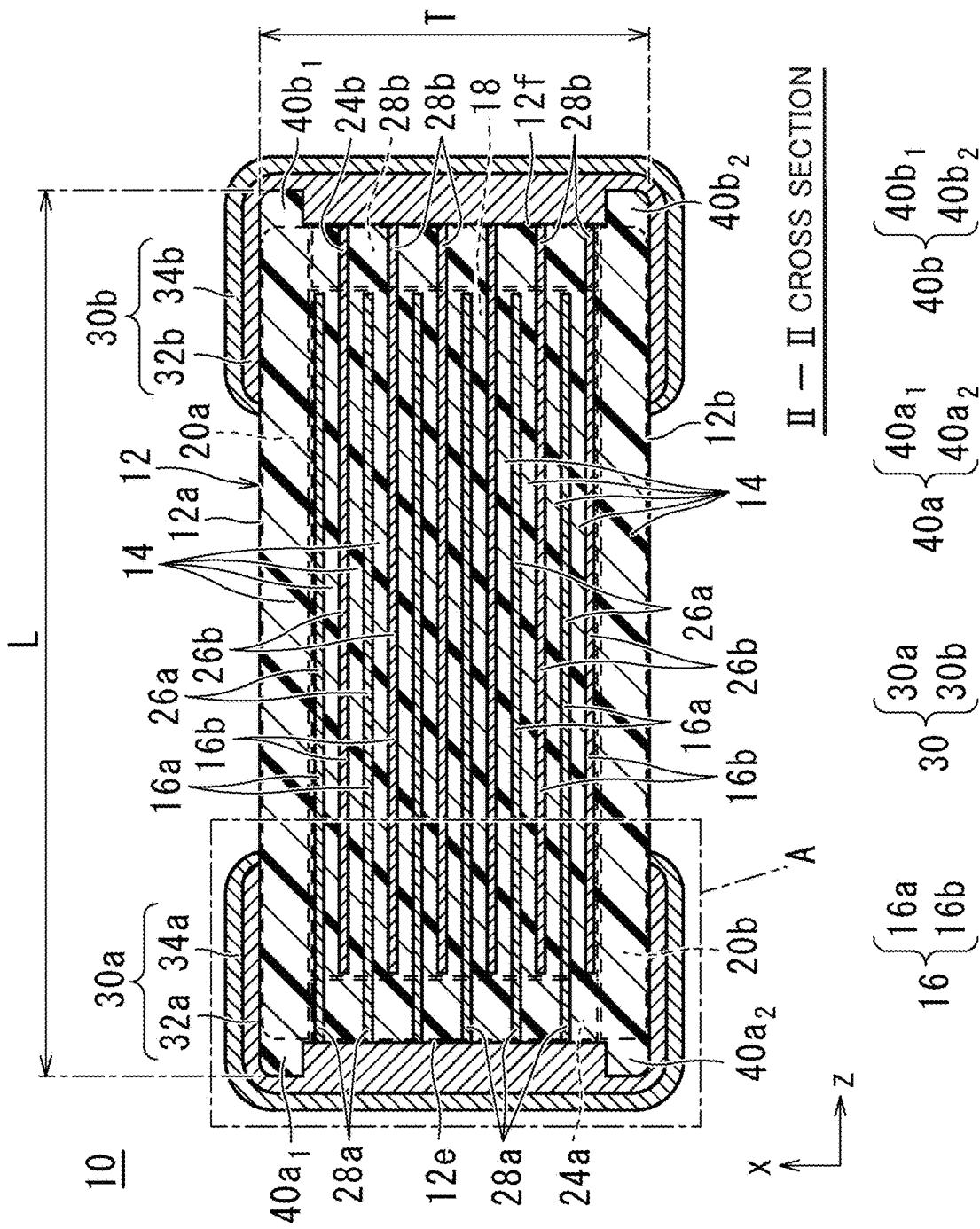
FIG. 2 is a cross-sectional view taken along the line II-II of FIG. 1.
Figure 3:
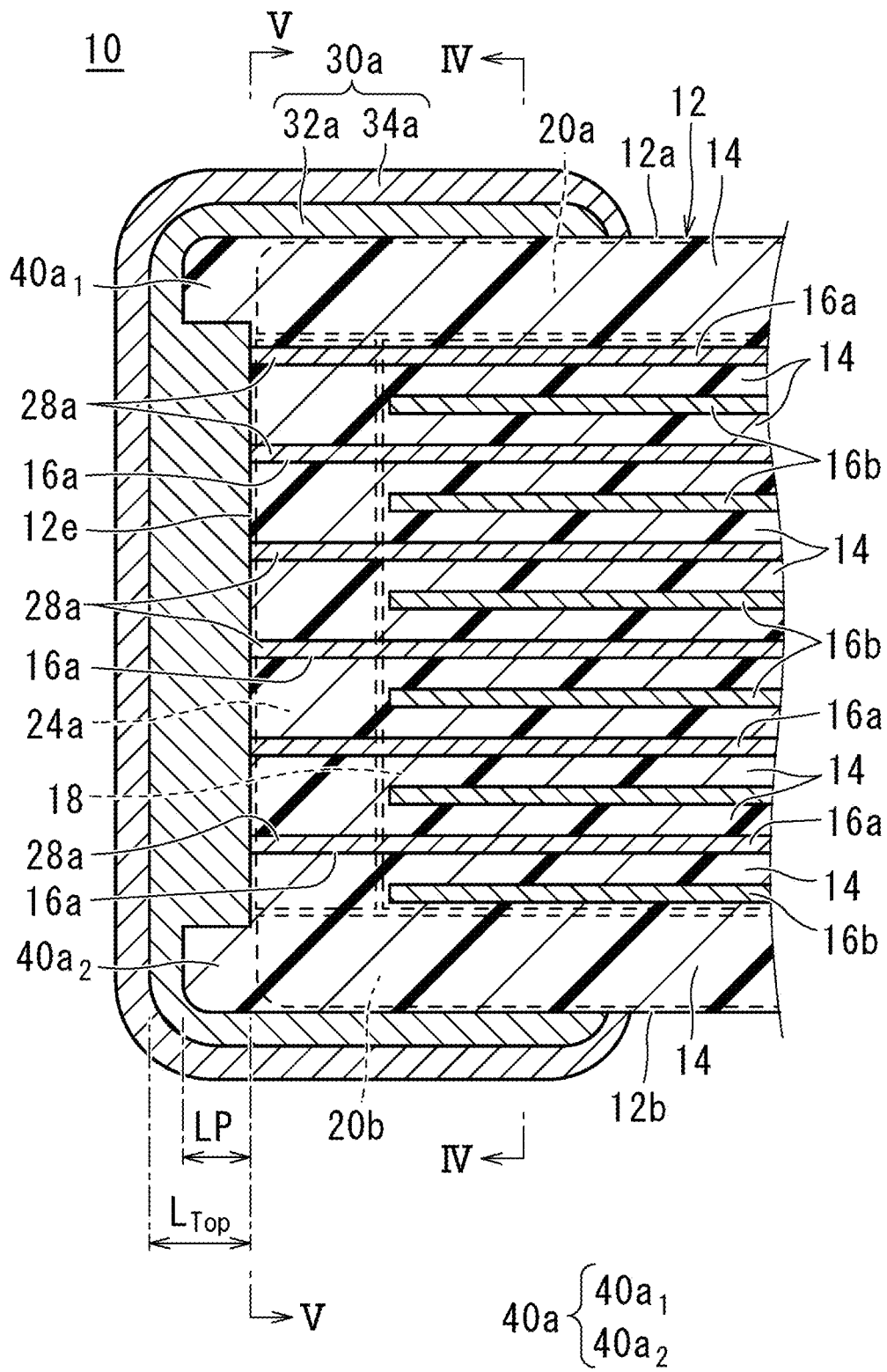
FIG. 3 is an enlarged view of a portion A in FIG. 2.
Figure 4:
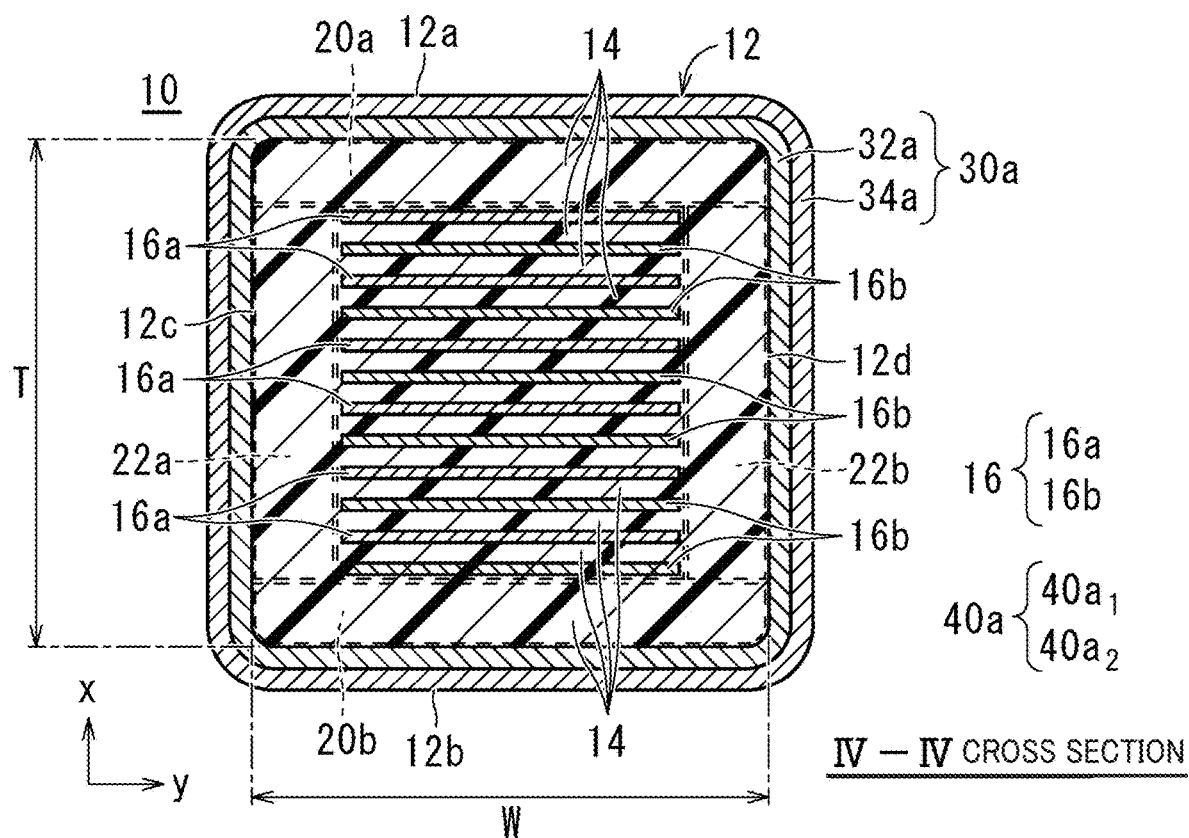
FIG. 4 is a cross-sectional view taken along the line IV-IV of FIG. 3.
Figure 5:
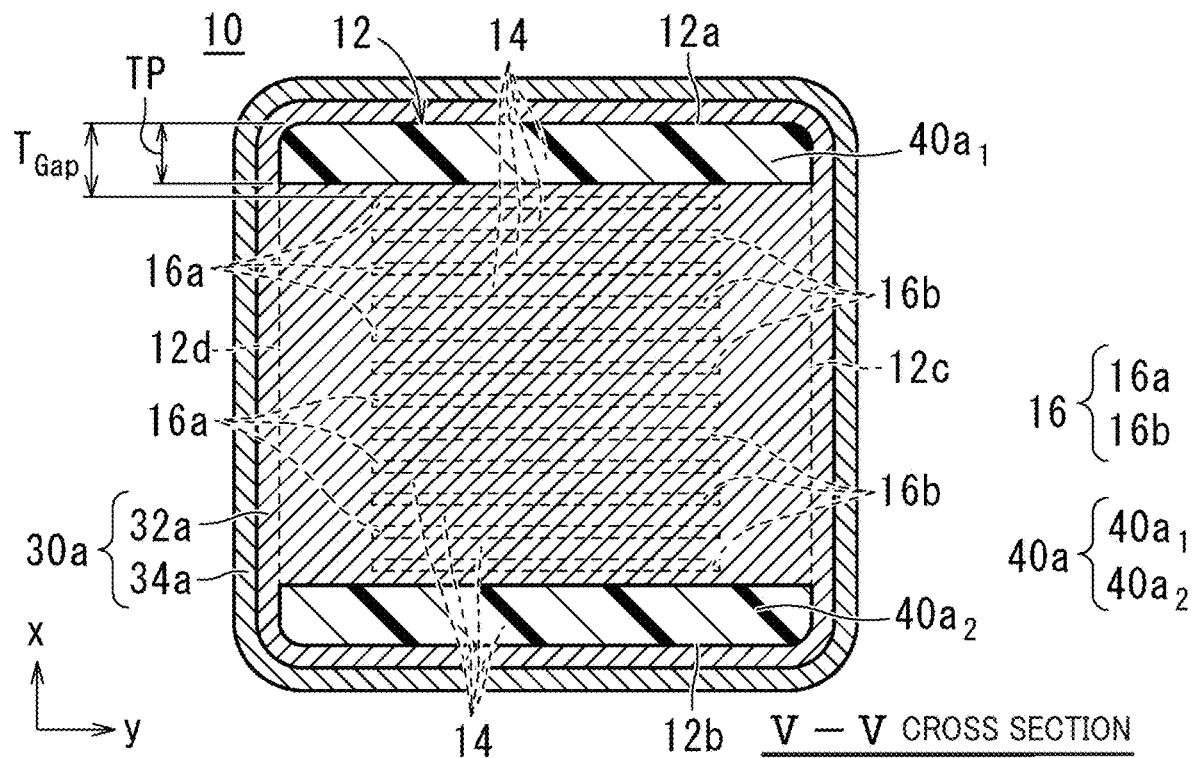
FIG. 5 is a cross-sectional view taken along the line V-V of FIG. 3.
Figure 6A:
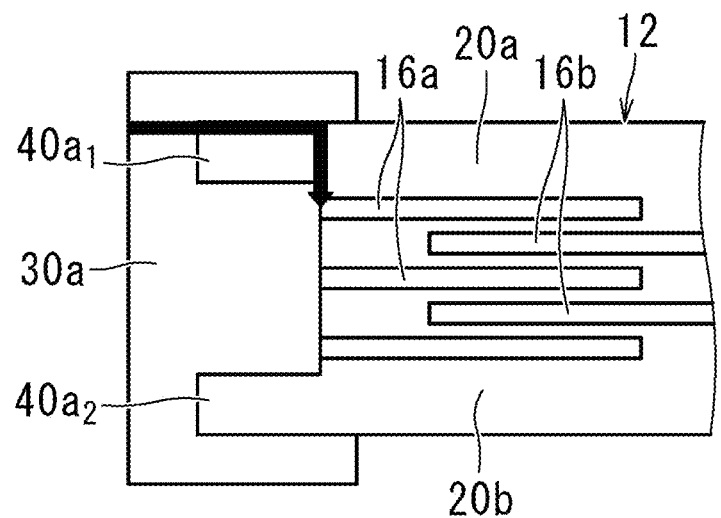
FIG. 6A is a schematic view of the multilayer ceramic capacitor according to the first preferred embodiment of the present invention.
Figure 6B:
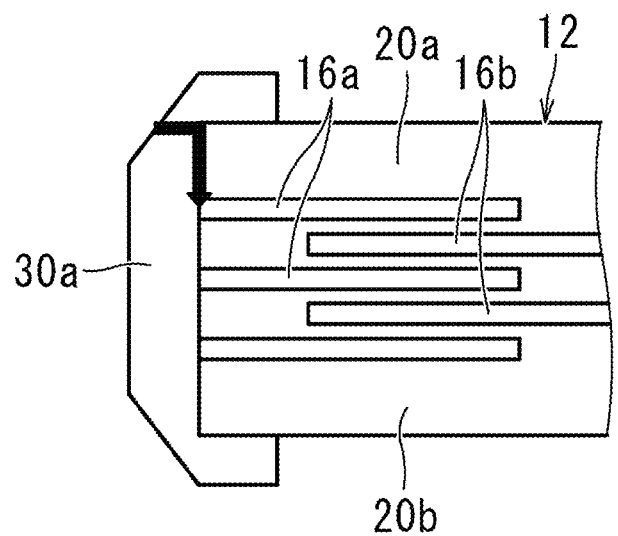
FIG. 6B is a schematic view of the multilayer ceramic capacitor according to the first preferred embodiment of the present invention.

A multilayer ceramic capacitor 10 according to a first preferred embodiment of the present invention will be described with reference to FIGS. 1 to 6B. FIG. 1 is an external perspective view of an example of a multilayer ceramic capacitor according to a first preferred embodiment of the present invention. FIG. 2 is a cross-sectional view taken along the line II-II of FIG. 1. FIG. 3 is an enlarged view of a portion A in FIG. 2. FIG. 4 is a cross-sectional view taken along the line IV-IV of FIG. 3. FIG. 5 is a cross-sectional view taken along the line V-V of FIG. 3. FIGS. 6A and 6B are schematic views of the multilayer ceramic capacitor according to the first preferred embodiment.

As shown in FIGS. 1 to 6B, the multilayer ceramic capacitor 10 includes a multilayer body 12 and external electrodes 30. The multilayer body 12 includes a configuration in which a plurality of dielectric layers 14 and a plurality of internal electrode layers 16 are alternately laminated. Hereinafter, each configuration of the multilayer ceramic capacitor 10 will be described in detail.

Multilayer Body

The multilayer body 12 includes a plurality of laminated dielectric layers 14, and includes a first main surface 12a and a second main surface 12b opposed to each other, a first lateral surface 12c and a second lateral surface 12d opposed to each other, and a first end surface 12e and a second end surface 12f opposed to each other. A direction between the first main surface 12a and the second main surface 12b is defined as an x direction, a direction between the first lateral surface 12c and the second lateral surface 12d is defined as a y direction, and a direction between the first end surface 12e and the second end surface 12f is defined as a z direction.

The multilayer body 12 has a rectangular or substantially rectangular parallelepiped shape. The multilayer body 12 may be rounded at corner portions or ridge portions. The corner portions are each a portion where three adjacent surfaces of the multilayer body 12 intersect, and the ridge portions are each a portion where two adjacent surfaces of the multilayer body 12 intersect. Furthermore, unevenness or the like may be provided in a portion or all of the first main surface 12a and the second main surface 12b, the first lateral surface 12c and the second lateral surface 12d, and the first end surface 12e and the second end surface 12f.

The dimension in the length direction z of the multilayer body 12 is defined as an L dimension. The L dimension is preferably, for example, about 1.5 mm or more and about 3.0 mm or less. The dimension of the multilayer body 12 in the width direction y is defined as a W dimension. The dimension W is preferably, for example, about 0.8 mm or more and about 2.4 mm or less. The dimension in the height direction x of the multilayer body 12 is defined as a T dimension. The T dimension is preferably, for example, about 0.8 mm or more and about 2.4 mm or less.

Dielectric Layer

The multilayer body 12 includes the plurality of dielectric layers 14 and the plurality of internal electrode layers 16. Furthermore, the multilayer body 12 includes an inner layer portion 18 in which the plurality of internal electrode layers 16 are opposed to each other.

The multilayer body 12 includes a first main surface-side outer layer portion 20a which is located adjacent to the first main surface 12a and includes a plurality of dielectric layers 14 located between the first main surface 12a, and the outermost surface of the inner layer portion 18 adjacent to the first main surface 12a and the extension line of the outermost surface. Similarly, the multilayer body 12 includes a second main surface-side outer layer portion 20b which is located adjacent to the second main surface 12b and includes a plurality of dielectric layers 14 located between the second main surface 12b, and the outermost surface of the inner layer portion 18 adjacent to the second main surface 12b and the extension line of the outermost surface.

The multilayer body 12 includes a first lateral surface-side outer layer portion 22a which is located adjacent to the first lateral surface 12c and includes a plurality of dielectric layers 14 located between the first lateral surface 12c, and the outermost surface of the inner layer portion 18 adjacent to the first lateral surface 12c and the extension line of the outermost surface. Similarly, the multilayer body 12 includes a second lateral surface-side outer layer portion 22b which is located adjacent to the second lateral surface 12d and includes a plurality of dielectric layers 14 located between the second lateral surface 12d, and the outermost surface of the inner layer portion 18 adjacent to the second lateral surface 12d and the extension line of the outermost surface.

The multilayer body 12 includes a first end surface-side outer layer portion 24a which is located adjacent to the first end surface 12e side and incudes a plurality of dielectric layers 14 located between the first end surface 12e, and the outermost surface of the inner layer portion 18 adjacent to the first end surface 12e and the extension line of the outermost surface. Similarly, the multilayer body 12 includes a second end surface-side outer layer portion 24b which is located adjacent to the second end surface 12f and includes a plurality of dielectric layers 14 located between the second end surface 12f, and the outermost surface of the inner layer portion 18 adjacent to the second end surface 12f and the extension line of the outermost surface.

As a ceramic material of the dielectric layer 14, for example, a dielectric ceramic made of a main component such as $BaTiO_3$, $CaTiO_3$, $SrTiO_3$, or $CaZrO_3$ can be used. Furthermore, a material obtained by adding a subcomponent such as, for example, a Mn compound, an Fe compound, a Cr compound, a Co compound, or a Ni compound to these main components may be used.

Inside the multilayer body 12, a plurality of first internal electrode layers 16a and a plurality of second internal electrode layers 16b, each having a rectangular or substantially rectangular shape, are alternately provided at equal or substantially equal intervals along the height direction x. The first internal electrode layer 16a and the second internal electrode layer 16b are parallel or substantially parallel to the first main surface 12a and the second main surface 12b, respectively. The first internal electrode layer 16a and the second internal electrode layer 16b are opposed to each other with the dielectric layer 14 interposed therebetween in the height direction x. The thickness of the dielectric layer 14 is preferably, for example, about 0.5 µm or more and about 10 µm or less.

On the first end surface 12e, first protruding portions 40a are provided which respectively extend along the first main surface 12a and the second main surface 12b to be opposed to each other at portions where the first main surface-side outer layer portion 20a and the second main surface-side outer layer portion 20b are positioned. Similarly, on the second end surface 12f, second protruding portions 40b are provided which respectively extend along the first main surface 12a and the second main surface 12b to be opposed to each other at portions where the first main surface-side outer layer portion 20a and the second main surface-side outer layer portion 20b are positioned. Furthermore, the first protruding portions 40a and the second protruding portions 40b do not overlap the inner layer portion 18.

More specifically, when viewed from the first end surface 12e, the first protruding portions 40a include a first protruding portion 40a1 which is adjacent to the first main surface 12a and extends along the first main surface 12a at a portion where the first main surface-side outer layer portion 20a is positioned, and a first protruding portion 40a2 which is adjacent to the second main surface 12b and extends along the second main surface 12b at a portion where the second main surface-side outer layer portion 20b is positioned. On the first end surface 12e, the first protruding portion 40a1 adjacent to the first main surface 12a and the first protruding portion 40a2 adjacent to the second main surface 12b are opposed to each other. Furthermore, when viewed from the second end surface 12f, the second protruding portions 40b include a second protruding portion 40b1 which is adjacent to the first main surface 12a and extends along the first main surface 12a at a portion where the first main surface-side outer layer portion 20a is positioned, and a second protruding portion 40b2 which is adjacent to the second main surface 12b and extends along the second main surface 12b at a portion where the second main surface-side outer layer portion 20b is positioned. On the second end surface 12f, the second protruding portion 40b1 adjacent to the first main surface 12a and the second protruding portion 40b2 adjacent to the second main surface 12b are opposed to each other.

The length in the height direction x of each of the first protruding portion 40a and the second protruding portion 40b is defined as TP, the length in the width direction y of each of the first protruding portion 40a and the second protruding portion 40b is defined as WP, and the length in the length direction z of each of the first protruding portion 40a and the second protruding portion 40b is defined as LP.

By providing the first protruding portion 40a and the second protruding portion 40b at the four corners of the first end surface 12e and the second end surface 12f of the multilayer body 12, as shown in FIG. 3, the first end surface 12e and the second end surface 12f of the multilayer body 12 each have a recessed shape in a side view. With such a configuration, when the multilayer body 12 is dipped in the electrically conductive paste, since the central portions of the first end surface 12e and the second end surface 12f are recessed, the thickness of the electrically conductive paste at the central portions of the first end surface 12e and the second end surface 12f of the multilayer body 12 becomes thin due to the influence of the surface tension and the gravity. This makes it possible to planarize the outer surfaces of the external electrodes 30, such that it is possible to reduce or prevent the tombstone phenomenon.

FIG. 6A is a schematic view of the multilayer ceramic capacitor 10 according to the present preferred embodiment, and FIG. 6B is a schematic view of a conventional multilayer ceramic capacitor. As shown in FIG. 6A, since the first protruding portions 40a and the second protruding portions 40b are provided at the four corners of the first end surface 12e and the second end surface 12f of the multilayer body 12 respectively, it is possible to increase the thicknesses of the external electrodes 30 at the four corners of the first end surface 12e and the second end surface 12f of the multilayer body 12 by the thicknesses of the first protruding portion 40a and the second protruding portion 40b. Therefore, the intrusion paths of the plating solution from the four corners of the first end surface 12e and the second end surface 12f of the multilayer body 12 to the internal electrode layers 16 become long (refer to the black arrows in FIGS. 6A and 6B), and thus, it is possible to improve moisture resistance.

Furthermore, since the first protruding portions 40a and the second protruding portions 40b are provided at the four corners of the first end surface 12e and the second end surface 12f of the multilayer body 12, an anchor effect between the external electrodes 30 and the multilayer body 12 is generated, and the adhesiveness between the multilayer body 12 and the external electrode 30 increases, such that a gap between the multilayer body 12 and the external electrode 30 is eliminated. Therefore, such a configuration achieves an advantageous effect of reducing or preventing moisture such as the plating solution from entering. Here, even if moisture such as the plating solution enters, since the length LP in the length direction z of the first protruding portion 40a and the second protruding portion 40b is adjusted to an appropriate value at the four corners of the first end surface 12e and the second end surface 12f of the multilayer body 12, the external electrodes 30 at the four corners of the first end surface 12e and the second end surface 12f of the multilayer body 12 are sufficiently thick by the length LP in the length direction z of the first protruding portion 40a and the second protruding portion 40b. Therefore, the intrusion paths of moisture such as a plating solution into the internal electrode layers 16 from the four corners of the first end surface 12e and the second end surface 12f of the multilayer body 12 become long, and thus, it is possible to improve moisture resistance. Therefore, by providing the first protruding portions 40a and the second protruding portions 40b at the four corners of the first end surface 12e and the second end surface 12f of the multilayer body 12, it is possible to improve moisture resistance while reducing or preventing the tombstone phenomenon.

The first protruding portions 40a and the second protruding portions 40b may include portions not continuous with the first main surface-side outer layer portion 20a and the second main surface-side outer layer portion 20b, respectively.

In a case where the first protruding portion 40a and the second protruding portion 40b are respectively continuous with the first main surface-side outer layer portion 20a and the second main surface-side outer layer portion 20b, when the external electrodes 30 are formed by a dipping method, since the first protruding portion 40a and the second protruding portion 40b are respectively provided continuously with the first main surface-side outer layer portion 20a and the second main surface-side outer layer portion 20b, there is no air leakage path which had existed in the first end surface 12e or the second end surface 12f of the multilayer body 12 before the multilayer body 12 was immersed in the electrically conductive paste. Therefore, when the first end surface 12e or the second end surface 12f of the multilayer body 12 is pulled up from the electrically conductive paste, pores remain in the electrically conductive paste adhered to the first end surface 12e or the second end surface 12f of the multilayer body 12, a result of which pin holes are generated in the external electrodes 30 formed by firing the electrically conductive paste adhered to the first end surface 12e or the second end surface 12f of the multilayer body 12.

When the first protruding portion 40a and the second protruding portion 40b are configured to include portions which are not continuous with the first main surface-side outer layer portion 20a and the second main surface-side outer layer portion 20b, respectively, it is possible for air existing in the first end surface 12e or the second end surface 12f of the multilayer body 12 before the first end surface 12e or the second end surface 12f of the multilayer body 12 is immersed in the electrically conductive paste to be discharged from a region in which the first protruding portion 40a and the second protruding portion 40b are not provided at portions of the first main surface-side outer layer portion 20a and the second main surface-side outer layer portion 20b, respectively. Therefore, when the first end surface 12e or the second end surface 12f of the multilayer body 12 is pulled up from the electrically conductive paste, it is possible to reduce or prevent the pores from remaining in the electrically conductive paste adhered to the first end surface 12e or the second end surface 12f of the multilayer body 12. Furthermore, it is possible to reduce or prevent the generation of pinholes in the external electrodes 30 provided by firing the electrically conductive paste adhered to the first end surface 12e or the second end surface 12f of the multilayer body 12.

The length WP in the longitudinal direction of a portion of each of the first protruding portions 40a facing the first end surface 12e and the length WP in the longitudinal direction of a portion of each of the second protruding portions 40b facing the second end surface 12f are preferably equal or substantially equal to the length W of a side of the first main surface 12a or the second main surface 12b, for example. In other words, the first protruding portions 40a and the second protruding portions 40b are preferably continuously provided in the width direction y in the regions near the edge sides adjacent to the first main surface 12a and the second main surface 12b, respectively. With such a configuration in which the first protruding portions 40a and the second protruding portions 40b are provided in this manner, when the external electrodes 30 are formed by a dipping method, since it is possible to make the external electrodes 30 thicker continuously in the region near the edge sides adjacent to the first lateral surface 12c and the second lateral surface 12d where the amount of formation of the electrically conductive paste is small, or in the region near the edge sides adjacent to the first main surface 12a and the second main surface 12b, it is possible to planarize the outer surfaces of the external electrodes 30, and thus, it is possible to reduce or prevent the tombstone phenomenon.

The length TP in the short direction of a portion of each of the first protruding portions 40a facing the first end surface 12e and the length TP in the short direction of a portion of each of the second protruding portions 40b facing the second end surface 12f are preferably, for example, about 40% or more and about 80% or less of the length $T_{gap}$ in the short direction of each of the first main surface-side outer layer portion 20a and the second main surface-side outer layer portion 20b. With such a configuration, it is possible to improve moisture resistance and further reduce or prevent appearance defects. Furthermore, when the length TP in the short direction of a portion of each of the first protruding portions 40a facing the first end surface 12e and the length TP in the short direction of a portion of each of the second protruding portions 40b facing the second end surface 12f are less than about 40% the length $T_{gap}$ of the first main surface-side outer layer portion 20a and the second main surface-side outer layer portion 20b in the short direction, since the thicknesses of the external electrodes 30 in the region near the edge sides of the first lateral surface 12c and the second lateral surface 12d or in the region near the edge sides of the first main surface 12a and the second main surface 12b cannot be sufficiently ensured, the intrusion paths of the plating solution from the four corners of the first end surface 12e and the second end surface 12f of the multilayer body 12 to the internal electrode layers 16 are shortened, such that moisture resistance is reduced. Furthermore, when the length TP in the short direction of a portion of each of the first protruding portions 40a facing the first end surface 12e and the length TP in the short direction of a portion of each of the second protruding portions 40b facing the second end surface 12f are about 80% or more with respect to the lengths $T_{gap}$ in the short direction of the first main surface-side outer layer portion 20a and the second main surface-side outer layer portion 20b, respectively, when the first protruding portion 40a and the second protruding portion 40b are provided by a masking jig, the unmasked region becomes small. Here, if the dimensions of the masking jig vary, the openings of the masking jig (i.e., the unmasked region) should be arranged at a position not over the internal electrode layers 16 in the original state, but the openings of the masking jig become narrower than the internal electrode layers 16, and the masking is performed even onto the internal electrode layers 16 which conventionally would have been polished. For this reason, a region where a portion of the internal electrode layers 16 is not polished is generated during the sandblasting process, and the first protruding portions 40a and the second protruding portions 40b do not exist in a portion of the internal electrode layers 16. As a result, the intrusion paths of the plating solution from the four corners of the first end surface 12e and the second end surface 12f of the multilayer body 12 to the internal electrode layers 16 are shortened, and moisture resistance is reduced.

The length LP of the first protruding portions 40a and the second protruding portions 40b in the length direction z of the multilayer body 12 is preferably, for example, about 0.1% or more and about 39% or less with respect to the thickness $L_{TOP}$ of the thickest portion of a base electrode layer 32 in the length direction z. With such a configuration, it is possible to improve moisture resistance and further reduce or prevent appearance defects. Furthermore, it is difficult to manufacture the first protruding portions 40a and the second protruding portion 40b each having a length LP in the length direction z of the multilayer body 12 which is less than about 0.1% with respect to the thickness $L_{TOP}$ of the thickest portion in the length direction of the base electrode layer 32. Furthermore, when the length LP of the first protruding portions 40a and the second protruding portions 40b in the length direction z of the multilayer body 12 is greater than about 39% with respect to the thickness $L_{TOP}$ of the thickest portion in the length direction of the base electrode layer 32, the first protruding portions 40a and the second protruding portions 40b are likely to be exposed on the surface of the external electrode 30, and the probability of appearance defects increases.

Furthermore, the surfaces of the first end surface 12e and the second end surface 12f other than the first protruding portions 40a and the second protruding portions 40b preferably each have a flat shape. When the surfaces of the first end surface 12e and the second end surface 12f other than the first protruding portions 40a and the second protruding portions 40b are flat, the surfaces of the base electrode layer 32 provided on the surfaces of the first end surface 12e and the second end surface 12f other than the first protruding portions 40a and the second protruding portions 40b can also be flat. As a result, the thickness at the central portion of the end surface of the base electrode layer 32 increases, such that it is possible to reduce or prevent the tombstone phenomenon generated when the thicknesses of the four corners of the end surface of the base electrode layer 32 are thin.

Next, a non-limiting example of a method of measuring the dimensions of the first protruding portions 40a and the second protruding portions 40b will be described. First, a method of measuring dimensions of the first protruding portions 40a and the second protruding portions 40b in the width direction y and the height direction x will be described. The external electrode 30 is polished by a polishing cloth from the length direction z of the multilayer body 12, and the external electrode 30 existing in the length direction z is completely removed to expose the first protruding portions 40a or the second protruding portions 40b. Next, the WT surface on which the first protruding portions 40a or the second protruding portions 40b are exposed is observed at a magnification of, for example, about 50 times or about 100 times under a microscope so that the entire WT surface can be observed, and measurement is performed using image processing software attached to the microscope. Next, an example of a method of measuring the dimension in the length direction z of the first protruding portions 40a and the second protruding portions 40b will be described. The external electrode 30 is polished by a polishing cloth from the width direction y of the multilayer boy 12, and the external electrode 30 existing in the width direction y is removed to expose the first protruding portions 40a or the second protruding portions 40b. Next, the LT surface on which the first protruding portions 40a or the second protruding portions 40b are exposed is observed at a magnification of, for example, about 50 times or about 100 times under a microscope so that the entire LT surface can be observed, and measurement is performed using image processing software attached to the microscope.

Internal Electrode Layer

The internal electrode layers 16 include first internal electrode layers 16a and second internal electrode layers 16b. Furthermore, the first internal electrode layers 16a and the second internal electrode layers 16b are alternately laminated with the plurality of dielectric layers 14 interposed therebetween. End portions of the first internal electrode layers 16a and the second internal electrode layers 16b each extend toward the surface of the multilayer body 12 to provide an exposed portion. More specifically, the first internal electrode layers 16a are each exposed at the first end surface 12e, and are not exposed at the first main surface 12a or the second main surface 12b, the first lateral surface 12c or the second lateral surface 12d, or the second end surface 12f. The second internal electrode layers 16b are each exposed at the second end surface 12f, and are not exposed at the first main surface 12a or the second main surface 12b, the first lateral surface 12c or the second lateral surface 12d, or the first end surface 12e. More specifically, the ends of the first internal electrode layer 16a and the second internal electrode layer 16b each may be slightly retracted from the first end surface 12e or the second end surface 12f.

Furthermore, the first internal electrode layers 16a and the second internal electrode layers 16b are provided so as not to overlap the first protruding portions 40a and the second protruding portions 40b.

Furthermore, the first internal electrode layers 16a and the second internal electrode layers 16b include counter portions 26 opposed to each other, and extension portions 28 each extending from the counter portion 26 toward the first end surface 12e or the second end surface 12f.

In the present preferred embodiment, the counter portions 26 of the internal electrode layers 16 are opposed to each other with the dielectric layer 14 interposed therebetween, such that capacitance is generated, and the characteristics of the capacitor are produced.

The first internal electrode layers 16a and the second internal electrode layers 16b each may be made of an appropriate electrically conductive material such as, for example, a metal such as Ni, Cu, Ag, Pd, or Au, or an alloy including at least one of these metals such as an Ag—Pd alloy.

When the electrically conductive resin layer is provided as the base electrode layer 32 of the external electrode 30, the metal of the internal electrode layer 16 provides a compound with the metal included in the electrically conductive resin layer.

The thicknesses of the first internal electrode layers 16a and the second internal electrode layers 16b are each preferably, for example, about 0.2 μm or more and about 2.0 μm or less.

External Electrode

The external electrodes 30 include a first external electrode 30a and a second external electrode 30b. The first external electrode 30a is connected to the first internal electrode layers 16a and is provided on the first end surface 12e. Furthermore, the first external electrode 30a may be provided on a portion of the first main surface 12a, a portion of the second main surface 12b, a portion of the first lateral surface 12c, and a portion of the second lateral surface 12d. In the present preferred embodiment, the external electrode 30a extends from the first end surface 12e to a portion of the first main surface 12a, a portion of the second main surface 12b, a portion of the first lateral surface 12c, and a portion of the second lateral surface 12d. The second external electrode 30b is connected to the second internal electrode layers 16b and is provided on the second end surface 12f. Furthermore, the second external electrode 30b may be provided on a portion of the first main surface 12a, a portion of the second main surface 12b, a portion of the first lateral surface 12c, and a portion of the second lateral surface 12d. In the present preferred embodiment, the second external electrode 30b extends from the second end surface 12f to a portion of the first main surface 12a, a portion of the second main surface 12b, a portion of the first lateral surface 12c, and a portion of the second lateral surface 12d.

The first external electrode 30a preferably includes a first base electrode layer 32a provided on the first end surface 12e and a first plated layer 34a provided on the first base electrode layer 32a. The second external electrode 30b preferably includes a second base electrode layer 32b provided on the second end surface 12f and a second plated layer 34b provided on the second base electrode layer 32b.

Base Electrode Layer

The base electrode layer 32 includes the first base electrode layer 32a and the second base electrode layer 32b. The base electrode layer 32 includes, for example, at least one selected from a fired layer, a conductive resin layer, and a thin film layer. Hereinafter, each configuration in a case where the base electrode layer 32 is a fired layer, a conductive resin layer, or a thin film layer will be described.

Fired Layer

The fired layer includes glass and metal. The glass of the fired layer includes, for example, at least one selected from the group consisting of B, Si, Ba, Sr, Ca, Mg, Al, Ti, Zr, K, Na and Li. The metal of the fired layer includes, for example, at least one selected from Cu, Ni, Ag, Pd, Ag—Pd alloy, Au, and the like. The fired layer may include a plurality of layers. In addition, the fired layer may be obtained by applying an electrically conductive paste including glass and a metal to the multilayer body and firing the resulting product, and the fired layer may be fired simultaneously with the internal electrode layer 16 or may be fired after firing the internal electrode layer 16.

When the fired layer is provided as the base electrode layers 32 on the first end surface 12e and the second end surface 12f, the thicknesses at the central portion in the height direction x of the first fired layer and the second fired layer which are the first base electrode layer 32a and the second base electrode layer 32b provided on the first end surface 12e and the second end surface 12f, respectively, is preferably, for example, about 10 µm or more and about 150 µm or less. Furthermore, in a case where fired layers are provided as the base electrode layers 32 on the first main surface 12a, the second main surface 12b, the first lateral surface 12c, and the second lateral surface 12d, the thicknesses at the central portion in the length direction z of the first fired layer and the second fired layer which are the first base electrode layer 32a and the second base electrode layer 32b which are provided on the first main surface 12a, the second main surface 12b, the first lateral surface 12c, and the second lateral surface 12d are, for example, about 10 µm or more and about 100 µm or less.

Electrically Conductive Resin Layer

The electrically conductive resin layer includes a first conductive resin layer and a second conductive resin layer. For example, the first conductive resin layer covers the first fired layer, and the second conductive resin layer covers the second fired layer. Specifically, the first and second conductive resin layers are preferably provided on the first and second fired layers located on the first end surface 12e and the second end surface 12f, and preferably reach the first and second fired layers located on the first main surface 12a, the second main surface 12b, the first lateral surface 12c, and the second lateral surface 12d. However, the first and second conductive resin layers may be provided only on the first and second fired layers positioned on the first end surface. The electrically conductive resin layer may be provided directly on the multilayer body without providing a fired layer.

The first and second conductive resin layers each include a thermosetting resin and a metal component.

As a specific example of the thermosetting resin, various known thermosetting resins such as epoxy resin, phenol resin, urethane resin, silicone resin, and polyimide resin can be used. Among them, an epoxy resin excellent in heat resistance, moisture resistance, adhesiveness and the like is one of the more suitable resins.

The first and second conductive resin layers preferably include a curing agent together with a thermosetting resin. When an epoxy resin is used as the base resin as the curing agent, various known compounds such as, for example, phenolic, amine-based, acid anhydride-based, and imidazole-based compounds can be used as the curing agent of the epoxy resin.

As the metal included in the first and second conductive resin layers, for example, Ag, Cu, or an alloy thereof can be used. Furthermore, a metal powder coated with Ag may be used. When a metal powder coated with Ag is used, for example, Cu or Ni is preferably used as the metal powder. Furthermore, Cu obtained by subjecting to oxidation prevention treatment can also be used. The reason that the Ag-coated metal is used is that the metal of the base material can be made inexpensively while maintaining the above-described Ag characteristics.

The amount of the metal included in the first and second conductive resin layers is preferably, for example, about 35 vol % or more and about 75 vol % or less with respect to the total volume of the electrically conductive resin layer. The shape of the metal included in the first and second conductive resin layers is not particularly limited. The metal included in the first and second conductive resin layers may have a spherical shape, a flat shape, or the like, and it is preferable to use a mixture of spherical and flat metal powders. The average particle size of the metal included in the first and second conductive resin layers is not particularly limited. The average particle size of the metal included in the first and second conductive resin layers may be, for example, about 0.3 µm or more and about 10 µm or less. The metal included in the first and second conductive resin layers mainly plays a role in the electrical conductivity of the electrically conductive resin layer. Specifically, the metals included in the first and second conductive resin layers are brought into contact with each other to provide an energization path inside the electrically conductive resin layer.

Since the first and second conductive resin layers include a thermosetting resin, the first and second conductive resin layers are more flexible than the base electrode layer 32 made of, for example, a plating film or a fired product of an electrically conductive paste. Therefore, even when a physical impact or an impact caused by thermal cycling is applied to the multilayer ceramic capacitor, the electrically conductive resin layer defines and functions as a buffer layer, and it is possible to reduce or prevent cracks in the multilayer ceramic capacitor.

The thicknesses of the first and second conductive resin layers are preferably, for example, about 10 µm or more and about 200 µm or less.

Thin Film Layer

The thin film layer is formed by a thin film forming method such as, for example, a sputtering method or a vapor deposition method, and is a layer having a thickness of, for example, about 1 µm or less on which metal particles are deposited.

Plated Layer

The plated layer 34 includes a first plated layer 34a and a second plated layer 34b. The plated layer 34 covers the base electrode layer 32. Specifically, the plated layer 34 is preferably provided on the first end surface 12e and the second end surface 12f on the base electrode layer 32, and preferably extend to the first main surface 12a, the second main surface 12b, the first lateral surface 12c, and the second lateral surface 12d on the base electrode layer 32. However, the plated layer 34 may be provided only on the first end surface 12e and the second end surface 12f on the base electrode layer 32.

Furthermore, the plated layer 34 includes, for example, at least one selected from Cu, Ni, Ag, Pd, Ag—Pd alloy, Au, and the like.

Furthermore, the plated layer 34 may include a plurality of layers. Preferably, for example, the plated layer 34 includes a two-layer structure of Ni plating and Sn plating. By providing the plated layer 34 made of Ni plating to cover the base electrode layer 32, when the multilayer ceramic capacitor 10 is mounted, it is possible to prevent the base electrode layer 32 from being eroded by solder used for mounting. Furthermore, by further providing the plated layer 34 made of the Sn plated layer on the plated layer 34 made of the Ni plated layer, when the multilayer ceramic capacitor 10 is mounted, it is possible to improve the wettability of the solder used for mounting, and it is possible to facilitate mounting.

Furthermore, the thickness of the Ni plated layer is preferably, for example, about 1 μm or more and about 15 μm or less. The thickness of the Sn plated layer is preferably, for example, about 1 μm or more and about 15 μm or less.

The dimension in the length direction z of the multilayer ceramic capacitor 10 is defined as the LM dimension. The LM dimension is preferably, for example, about 1.6 mm or more and about 3.2 mm or less. The dimension in the width direction y of the multilayer ceramic capacitor 10 is defined as the WM dimension. The WM dimension is preferably, for example, about 0.8 mm or more and about 2.5 mm or less. The dimension in the height direction x of the multilayer ceramic capacitor 10 is defined as the TM dimension. The TM dimension is preferably, for example, about 0.8 mm or more and about 2.5 mm or less.

1-2. Method of Manufacturing Multilayer Ceramic Capacitor

Next, a non-limiting example of a method of manufacturing the multilayer ceramic capacitor 10 according to the first preferred embodiment will be described.

First, a dielectric sheet and an electrically conductive paste for manufacturing internal electrodes are prepared. The dielectric sheet and the electrically conductive paste for manufacturing internal electrodes include a binder and a solvent. Known binders and solvents can be used.

Next, a dielectric sheet on which an internal electrode pattern is not printed, and a dielectric sheet on which an electrically conductive paste for internal electrodes is printed on the dielectric sheet in a predetermined pattern by, for example, screen printing or gravure printing, and on which a first internal electrode pattern is printed and a second internal electrode pattern are printed are prepared.

Next, a predetermined number of dielectric sheets including no internal electrode pattern printed thereon are laminated to form a portion serving as the first main surface-side outer layer portion 20a. Thereafter, on the portion defining and functioning as the first main surface-side outer layer portion 20a, the dielectric sheets including the first internal electrode pattern and the second internal electrode pattern printed thereon are sequentially laminated to form a portion serving as the inner layer portion 18. Furthermore, on the portion serving as the inner layer portion 18, a predetermined number of dielectric sheets including no internal electrode pattern printed thereon are laminated to form a portion defining and functioning as the second main surface-side outer layer portion 20b.

Next, the laminated sheet is pressed in the laminating direction by, for example, hydrostatic pressing to prepare a laminated block.

Next, the laminated block is cut into a predetermined size, and a multilayer chip is cut out. At this time, the corner portions and ridge portions of the multilayer chip may be rounded by, for example, barrel polishing or the like.

Next, the multilayer chip is fired to prepare a multilayer body 12. The firing temperature depends on the materials of the dielectric layer 14 and the internal electrode layer 16, but is preferably, for example, about 900° C. or higher and about 1400° C. or lower.

Next, a multilayer chip fixing jig is provided adjacent to the first end surface 12e or the second end surface 12f of the multilayer chip to fix the multilayer chip.

Next, a masking jig is provided adjacent to the first end surface 12e or the second end surface 12f where the multilayer chip is not fixed.

Next, for example, sandblasting is performed for the first end surface 12e or the second end surface 12f where the multilayer chip is not fixed, and the unmasked regions of the first end surface 12e and the second end surface 12f are polished. Here, since the masked region is not processed by sandblasting, the multilayer chip is not polished, and therefore, the masked region defines and functions as the first protruding portions 40a and the second protruding portions 40b. The dimension in the length direction z, the dimension in the width direction y, and the dimension in the height direction x of each of the first protruding portions 40a and the second protruding portions 40b can be controlled by the time of sandblasting, the strength of spraying, the masking position, and the masking shape, for example. Here, as the blasting media used in the sandblasting treatment, alumina powder can be used.

Next, an electrically conductive paste for manufacturing a base electrode including a metal component and a glass component is prepared.

Next, an electrically conductive paste defining and functioning as the base electrode layer 32 is applied to the first end surface 12e and the second end surface 12f of the multilayer body 12 to form the base electrode layer 32. For example, an electrically conductive paste is applied to the first end surface 12e and the second end surface 12f of the multilayer body 12 by a method such as, for example, dipping or screen printing, and then firing is performed to form the base electrode layer 32. The temperature of the firing treatment at this time is preferably, for example, about 700° C. or higher and about 900° C. or lower.

If necessary, plating is performed on the surface of the base electrode layer 32 to form the plated layer 34. In the present preferred embodiment, two plated layers 34 are provided on the surface of the base electrode layer 32. Specifically, for example, a Ni plated layer and a Sn plated layer are provided on the base electrode layer 32. The Ni plated layer and the Sn plated layer are sequentially formed by, for example, barrel plating.

As described above, the multilayer ceramic capacitor 10 according to the present preferred embodiment is manufactured.

Modified Example of First Preferred Embodiment

1-3. Multilayer Ceramic Capacitor

Figure 7:
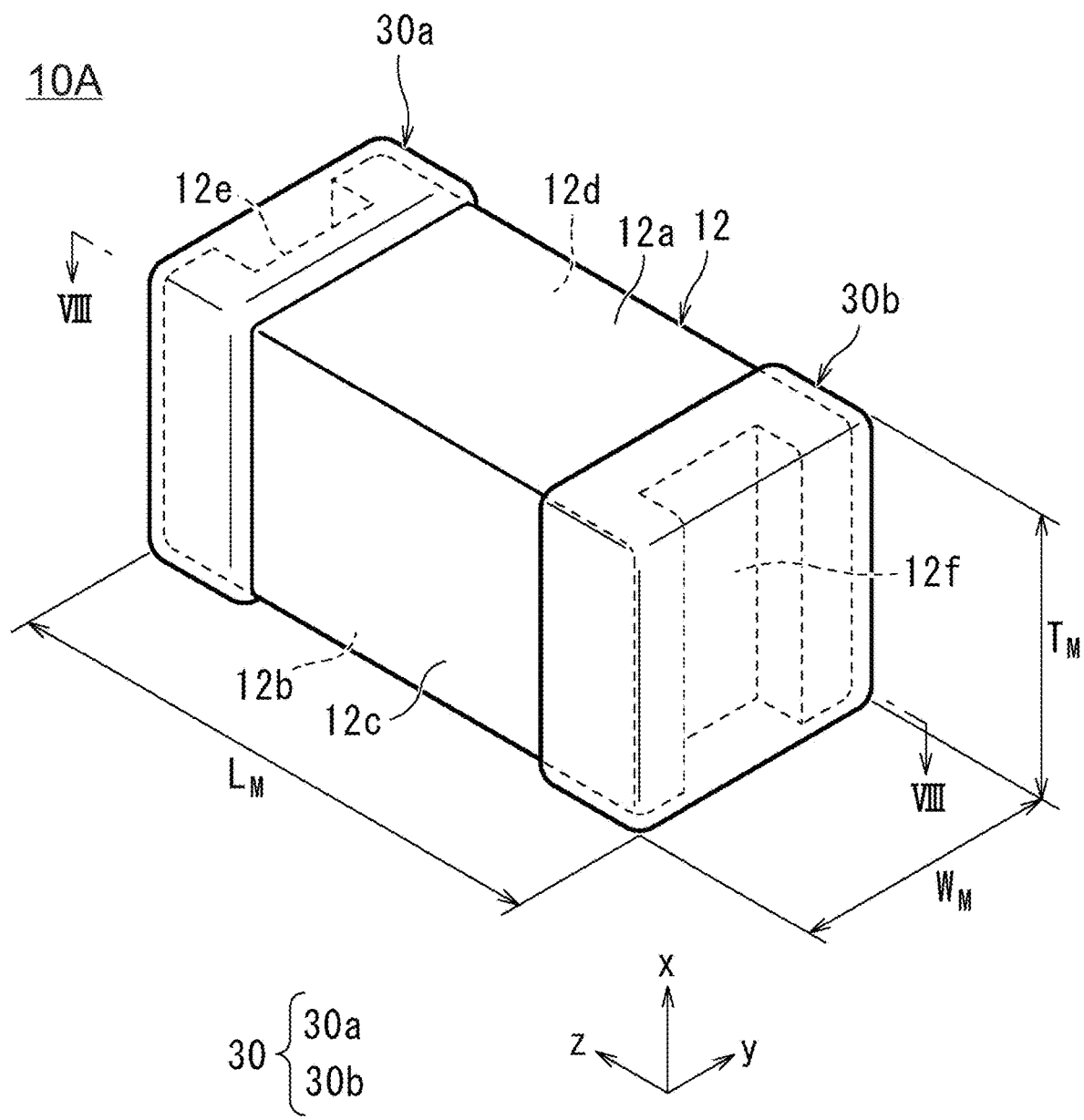
FIG. 7 is an external perspective view of an example of a multilayer ceramic capacitor according to a modified example of the first preferred embodiment of the present invention.
Figure 8:
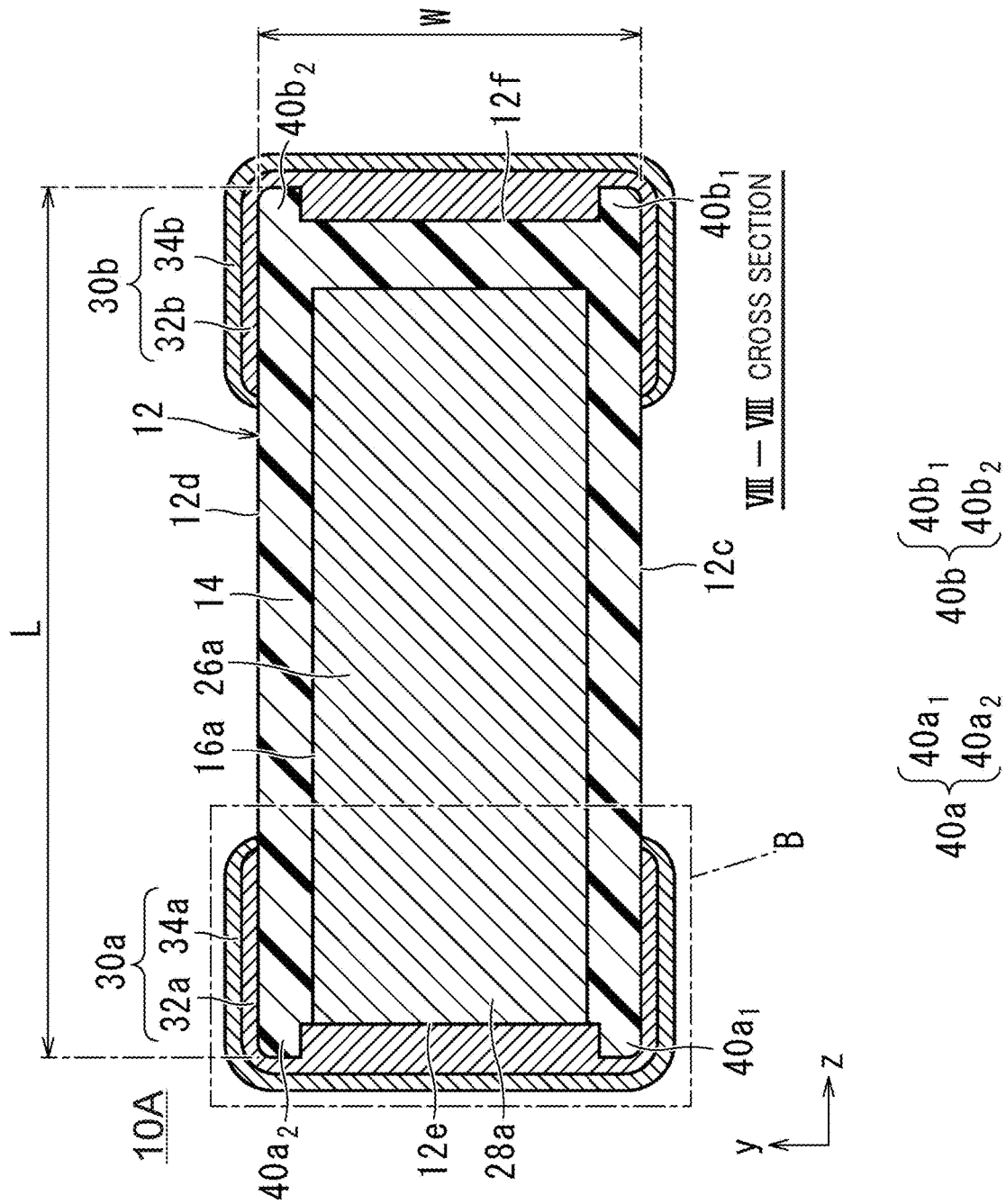
FIG. 8 is a cross-sectional view taken along the line VIII-VIII of FIG. 7.
Figure 9:
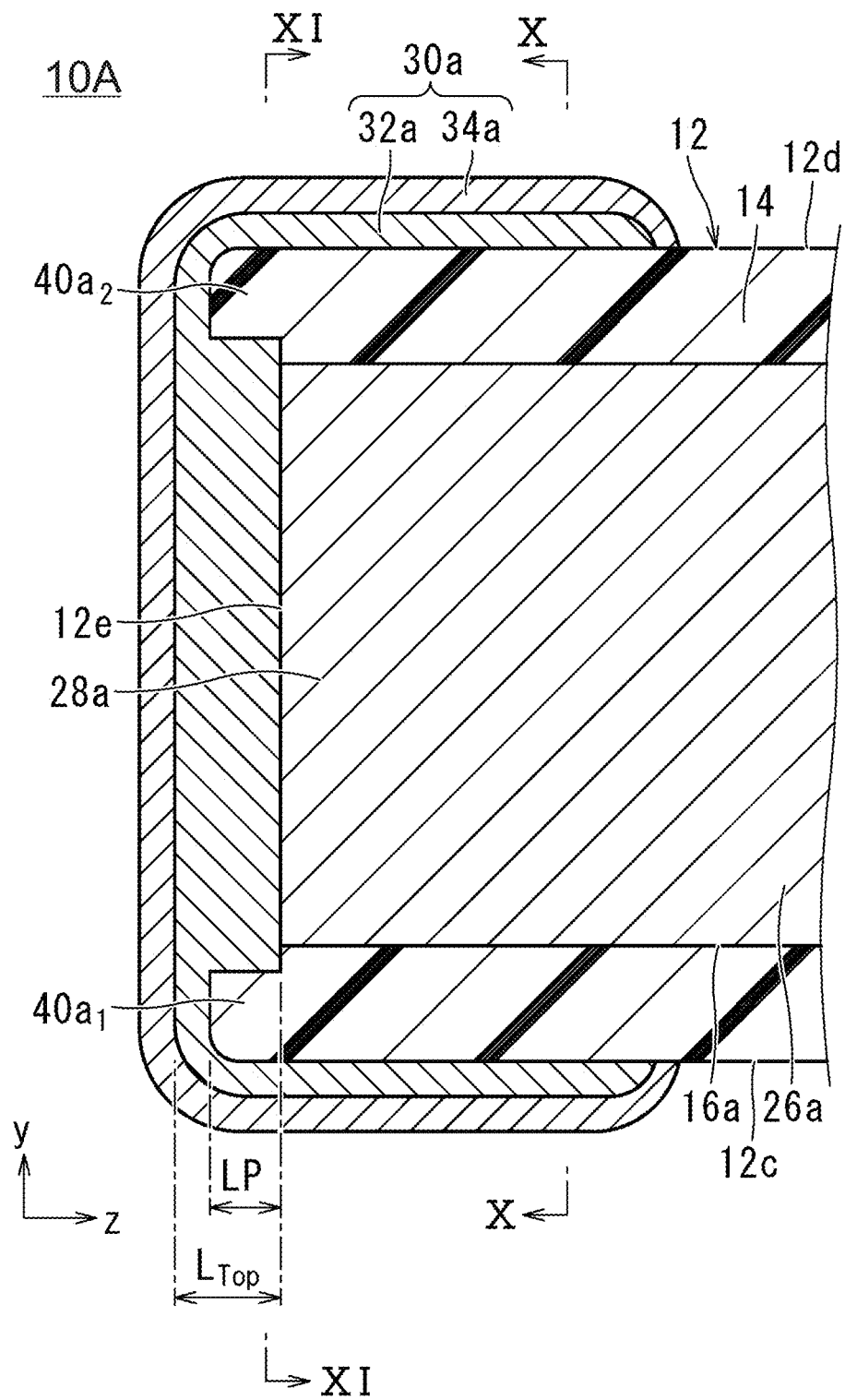
FIG. 9 is an enlarged view of a portion B in FIG. 8.
Figure 10:
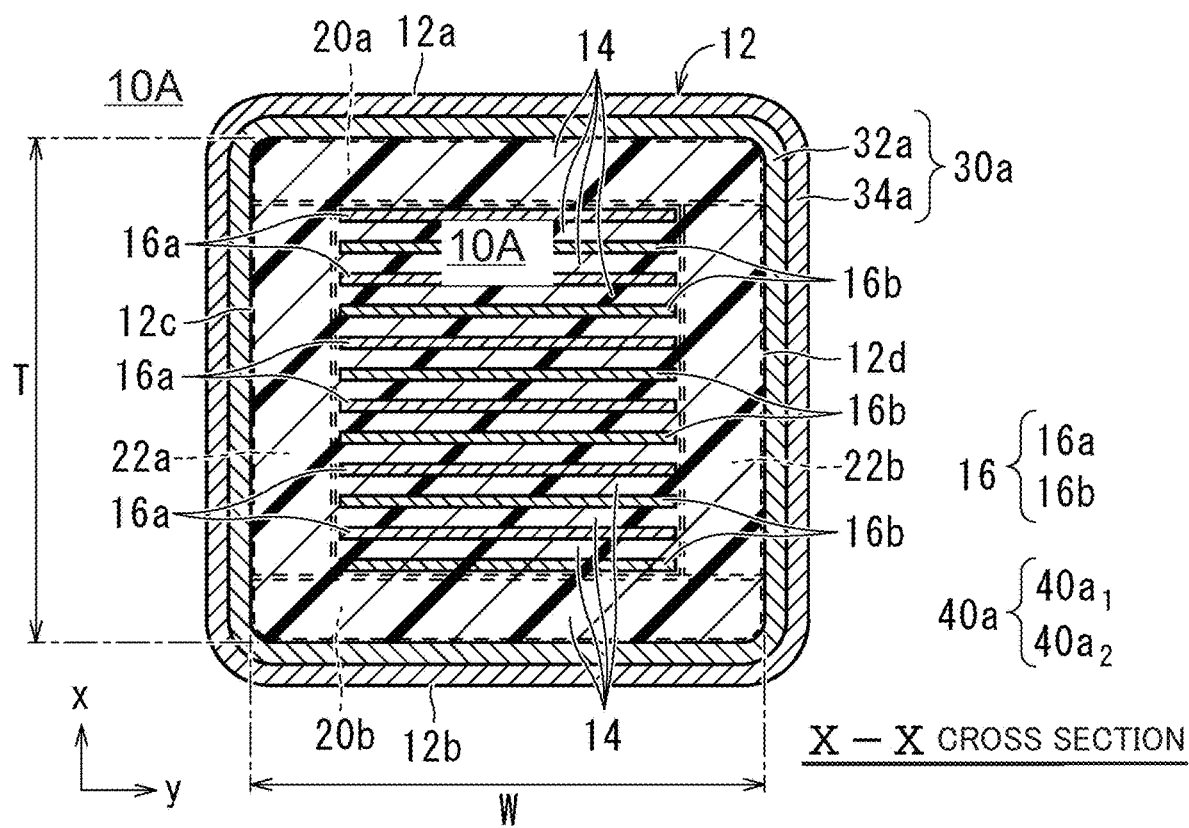
FIG. 10 is a cross-sectional view taken along the line X-X of FIG. 8.
Figure 11:
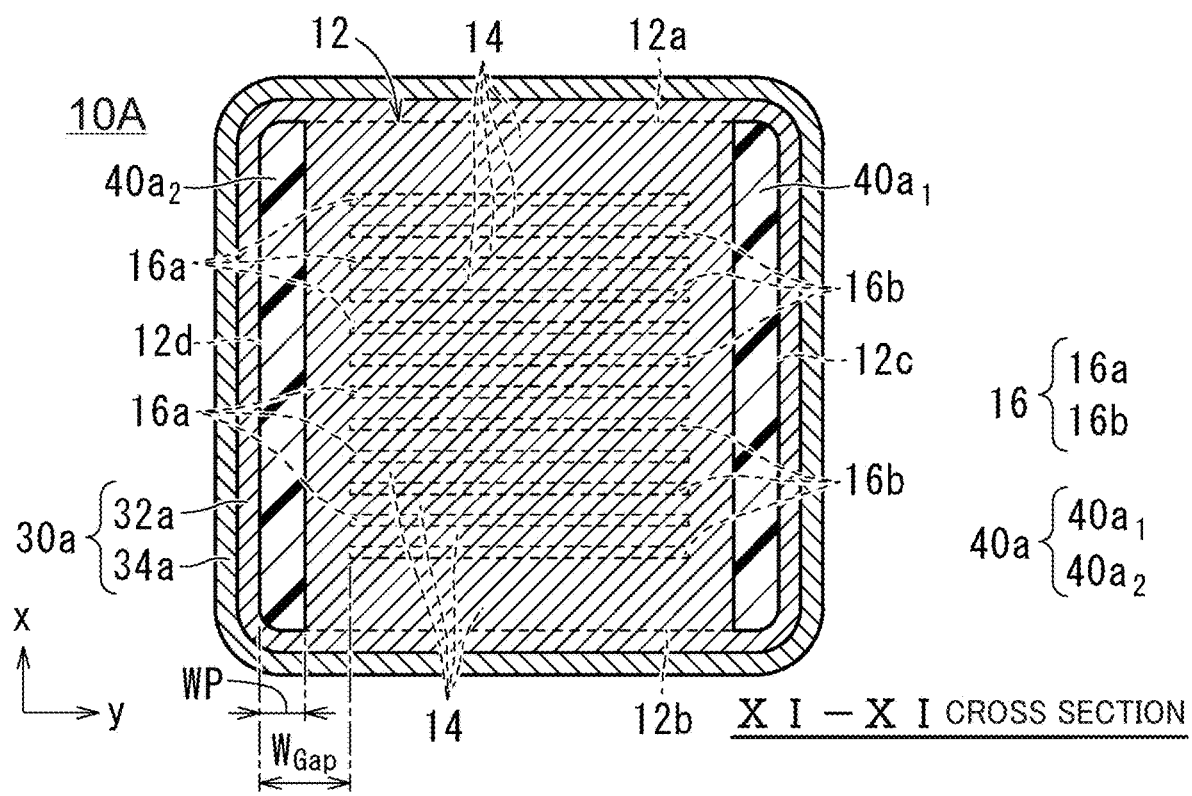
FIG. 11 is a cross-sectional view taken along the line XI-XI of FIG. 8.

A modified example of the multilayer ceramic capacitor according to the first preferred embodiment of the present invention will be described with reference to FIGS. 7 to 11. FIG. 7 is an external perspective view showing an example of a multilayer ceramic capacitor according to a modified example of the first preferred embodiment. FIG. 8 is a cross-sectional view taken along the line VIII-VIII of FIG. 7. FIG. 9 is an enlarged view of a portion B in FIG. 8. FIG. 10 is a cross-sectional view taken along the line X-X of FIG. 8. FIG. 11 is a cross-sectional view taken along the line XI-XI of FIG. 8.

The multilayer ceramic capacitor 10A according to the modified example of the first preferred embodiment differs from the multilayer ceramic capacitor 10 according to the first preferred embodiment only in the shapes of the first protruding portions 40a and the second protruding portions 40b provided on the first end surface 12e and the second end surface 12f of the multilayer body 12. Therefore, components corresponding to those of the first preferred embodiment are denoted by the same reference numerals, and detailed descriptions thereof will be omitted.

As shown in FIGS. 7 to 11, the multilayer ceramic capacitor 10A includes a multilayer body 12A and external electrodes 30. The multilayer body 12A includes a configuration in which a plurality of dielectric layers 14 and internal electrode layers 16 are alternately laminated.

Multilayer Body

The multilayer body 12A includes a plurality of laminated dielectric layers 14, and includes a first main surface 12a and a second main surface 12b opposed to each other, a first lateral surface 12c and a second lateral surface 12d opposed to each other, and a first end surface 12e and a second end surface 12f opposed to each other. A direction between the first main surface 12a and the second main surface 12b is defined as an x direction, a direction between the first lateral surface 12c and the second lateral surface 12d is defined as a y direction, and a direction between the first end surface 12e and the second end surface 12f is defined as a z direction.

Dielectric Layer

The multilayer body 12A includes a plurality of dielectric layers 14 and a plurality of internal electrode layers 16. The multilayer body 12A includes an inner layer portion 18 in which a plurality of internal electrode layers 16 are opposed to each other.

The multilayer body 12A includes a first main surface-side outer layer portion 20a which is located adjacent to the first main surface 12a and includes a plurality of dielectric layers 14 located between the first main surface 12a, and the outermost surface of the inner layer portion 18 adjacent to the first main surface 12a and the extension line of the outermost surface. Similarly, the multilayer body 12A includes a second main surface-side outer layer portion 20b which is located adjacent to the second main surface 12b and includes a plurality of dielectric layers 14 located between the second main surface 12b, and the outermost surface of the inner layer portion 18 adjacent to the second main surface 12b and the extension line of the outermost surface.

The multilayer body 12A includes a first lateral surface-side outer layer portion 22a which is located adjacent to the first lateral surface 12c and includes a plurality of dielectric layers 14 located between the first lateral surface 12c, and the outermost surface of the inner layer portion 18 adjacent to the first lateral surface 12c and the extension line of the outermost surface. Similarly, the multilayer body 12A includes a second lateral surface-side outer layer portion 22b which is located adjacent to the second lateral surface 12d and includes a plurality of dielectric layers 14 located between the second lateral surface 12d, and the outermost surface of the inner layer portion 18 adjacent to the second lateral surface 12d and the extension line of the outermost surface.

The multilayer body 12A includes a first end surface-side outer layer portion 24a which is located adjacent to the first end surface 12e side and incudes a plurality of dielectric layers 14 located between the first end surface 12e, and the outermost surface of the inner layer portion 18 adjacent to the first end surface 12e and the extension line of the outermost surface. Similarly, the multilayer body 12A includes a second end surface-side outer layer portion 24b which is located adjacent to the second end surface 12f and includes a plurality of dielectric layers 14 located between the second end surface 12f, and the outermost surface of the inner layer portion 18 adjacent to the second end surface 12f and the extension line of the outermost surface.

On the first end surface 12e, first protruding portions 40a are provided which respectively extend along the first lateral surface 12c and the second lateral surface 12d to be opposed to each other at portions where the first lateral surface-side outer layer portion 22a and the second lateral surface-side outer layer portion 22b are positioned. Similarly, on the second end surface 12f, second protruding portions 40b are provided which respectively extend along the first lateral surface 12c and the second lateral surface 12d to be opposed to each other at portions where the first lateral surface-side outer layer portion 22a and the second lateral surface-side outer layer portion 22b are positioned. Further, the first protruding portions 40a and the second protruding portions 40b do not overlap the inner layer portion 18.

More specifically, when viewed from the first end surface 12e, the first protruding portions 40a include a first protruding portion 40a1 which is adjacent to the first lateral surface 12c and extends along the first lateral surface 12c at a portion where the first lateral surface-side outer layer portion 22a is positioned, and a first protruding portion 40a2 which is adjacent to the second lateral surface 12d and extends along the second lateral surface 12d at a portion where the second lateral surface-side outer layer portion 22b is positioned. On the first end surface 12e, the first protruding portion 40a1 adjacent to the first lateral surface 12c and the first protruding portion 40a2 adjacent to the second lateral surface 12d are opposed to each other. Furthermore, when viewed from the second end surface 12f, the second protruding portions 40b include a second protruding portion 40b1 which is adjacent to the first lateral surface 12c and extends along the first lateral surface 12c at a portion where the first lateral surface-side outer layer portion 22a is positioned, and a second protruding portion 40b2 which is adjacent to the second lateral surface 12d and extends along the second lateral surface 12d at a portion where the second lateral surface-side outer layer portion 22b is positioned. On the second end surface 12f, the second protruding portion 40b1 adjacent to the first lateral surface 12c and the second protruding portion 40b2 adjacent to the second lateral surface 12d are opposed to each other.

The length in the height direction x of each of the first protruding portion 40a and the second protruding portion 40b is defined as TP, the length in the width direction y of each of the first protruding portion 40a and the second protruding portion 40b is defined as WP, and the length in the length direction z of each of the first protruding portion 40a and the second protruding portion 40b is defined as LP.

By providing the first protruding portion 40a and the second protruding portion 40b at the four corners of the first end surface 12e and the second end surface 12f of the multilayer body 12A, as shown in FIG. 8, the first end surface 12e and the second end surface 12f of the multilayer body 12A each has a recessed shape in a side view. With such a configuration, when the multilayer body 12A is dipped in the electrically conductive paste, since the central portions of the first end surface 12e and the second end surface 12f are recessed, the thickness of the electrically conductive paste at the central portions of the first end surface 12e and the second end surface 12f of the multilayer body 12A becomes thin due to the influence of the surface tension and the gravity. This makes it possible to planarize the outer surfaces of the external electrodes 30, such that it is possible to reduce or prevent the tombstone phenomenon.

Furthermore, since the first protruding portions 40a and the second protruding portions 40b are provided at the four corners of the first end surface 12e and the second end surface 12f of the multilayer body 12A respectively, it is possible to increase the thicknesses of the external electrodes 30 at the four corners of the first end surface 12e and the second end surface 12f of the multilayer body 12A by the thicknesses of the first protruding portion 40a and the second protruding portion 40b. Therefore, the intrusion paths of the plating solution from the four corners of the first end surface 12e and the second end surface 12f of the multilayer body 12A to the internal electrode layers 16 become long, and thus, it is possible to improve moisture resistance.

Furthermore, since the first protruding portions 40a and the second protruding portions 40b are provided at the four corners of the first end surface 12e and the second end surface 12f of the multilayer body 12A, an anchor effect between the external electrodes 30 and the multilayer body 12A is generated, and the adhesiveness between the multilayer body 12A and the external electrode 30 increases, such that a gap between the multilayer body 12A and the external electrode 30 is eliminated. Therefore, such a configuration achieves an advantageous effect of reducing or preventing moisture such as the plating solution from entering. Here, even if moisture such as the plating solution enters, since the length LP in the length direction z of the first protruding portion 40a and the second protruding portion 40b is adjusted to an appropriate value at the four corners of the first end surface 12e and the second end surface 12f of the multilayer body 12A, the external electrodes 30 at the four corners of the first end surface 12e and the second end surface 12f of the multilayer body 12A are sufficiently thick by the length LP in the length direction z of the first protruding portion 40a and the second protruding portion 40b. Therefore, the intrusion paths of moisture such as a plating solution into the internal electrode layers 16 from the four corners of the first end surface 12e and the second end surface 12f of the multilayer body 12A become long, and thus, it is possible to improve moisture resistance. Therefore, by providing the first protruding portions 40a and the second protruding portions 40b at the four corners of the first end surface 12e and the second end surface 12f of the multilayer body 12A, it is possible to improve moisture resistance while reducing or preventing the tombstone phenomenon.

The first protruding portions 40a and the second protruding portions 40b may include portions not continuous with the first lateral surface-side outer layer portion 22a and the second lateral surface-side outer layer portion 22b, respectively.

In a case where the first protruding portion 40a and the second protruding portion 40b are respectively continuous with the first lateral surface-side outer layer portion 22a and the second lateral surface-side outer layer portion 22b, when the external electrodes 30 are formed by a dipping method, since the first protruding portion 40a and the second protruding portion 40b are respectively provided continuously with the first lateral surface-side outer layer portion 22a and the second lateral surface-side outer layer portion 22b, there is no air leakage path which had existed in the first end surface 12e or the second end surface 12f of the multilayer body 12A before the multilayer body 12A was immersed in the electrically conductive paste. Therefore, when the first end surface 12e or the second end surface 12f of the multilayer body 12A is pulled up from the electrically conductive paste, pores remain in the electrically conductive paste adhered to the first end surface 12e or the second end surface 12f of the multilayer body 12A, a result of which pin holes are generated in the external electrodes 30 formed by firing the electrically conductive paste adhered to the first end surface 12e or the second end surface 12f of the multilayer body 12A.

When the first protruding portion 40a and the second protruding portion 40b are configured to include portions which are not continuous with the first lateral surface-side outer layer portion 22a and the second lateral surface-side outer layer portion 22b, respectively, it is possible for air existing in the first end surface 12e or the second end surface 12f of the multilayer body 12A before the first end surface 12e or the second end surface 12f of the multilayer body 12A is immersed in the electrically conductive paste to be discharged from a region in which the first protruding portion 40a and the second protruding portion 40b are not provided at portions of the first lateral surface-side outer layer portion 22a and the second lateral surface-side outer layer portion 22b, respectively. Therefore, when the first end surface 12e or the second end surface 12f of the multilayer body 12A is pulled up from the electrically conductive paste, it is possible to reduce or prevent the remaining of the pores in the electrically conductive paste adhered to the first end surface 12e or the second end surface 12f of the multilayer body 12A. Furthermore, it is possible to reduce or prevent the generation of pinholes in the external electrodes 30 provided by firing the electrically conductive paste adhered to the first end surface 12e or the second end surface 12f of the multilayer body 12A.

The length TP in the longitudinal direction of a portion of each of the first protruding portions 40a facing the first end surface 12e and the length TP in the longitudinal direction of a portion of each of the second protruding portions 40b facing the second end surface 12f are preferably equal or substantially equal to the length T of a side of the first lateral surface 12c or the second lateral surface 12d, for example. With such a configuration, a path through which moisture such as a plating solution enters the internal electrode layers 16 from the four corners of the first end surface 12e and the second end surface 12f of the multilayer body 12A becomes long, and thus, it is possible to improve moisture resistance.

The first protruding portions 40a and the second protruding portions 40b are preferably continuously provided in the height direction x in the regions near the edge sides adjacent to the first lateral surface 12c and the second lateral surface 12d, respectively. With such a configuration in which the first protruding portions 40a and the second protruding portions 40b are provided in this manner, when the external electrodes 30 are formed by a dipping method, since it is possible to make the external electrodes 30 thicker continuously in the region near the edge sides adjacent to the first lateral surface 12c and the second lateral surface 12d where the amount of formation of the electrically conductive paste is small, or in the region near the edge sides adjacent to the first main surface 12a and the second main surface 12b, it is possible to planarize the outer surfaces of the external electrodes 30, and thus, it is possible to reduce or prevent the tombstone phenomenon.

The length WP in the short direction of a portion of each of the first protruding portions 40a facing the first end surface 12e and the length WP in the short direction of a portion each of the second protruding portions 40b facing the second end surface 12f are preferably, for example, about 40% or more and about 80% or less of the length $W_{gap}$ in the short direction of each of the first lateral surface-side outer layer portion 22a and the second lateral surface-side outer layer portion 22b. With such a configuration, it is possible to improve moisture resistance and further reduce appearance defects. Furthermore, when the length WP in the short direction of a portion of each of the first protruding portions 40a facing the first end surface 12e and the length WP in the short direction of a portion of each of the second protruding portions 40b facing the second end surface 12f are less than about 40% the length $W_{gap}$ of the first lateral surface-side outer layer portion 22a and the second lateral surface-side outer layer portion 22b in the short direction, since the thicknesses of the external electrodes 30 in the region near the edge sides of the first lateral surface 12c and the second lateral surface 12d or in the region near the edge sides of the first main surface 12a and the second main surface 12b cannot be sufficiently ensured, the intrusion paths of the plating solution from the four corners of the first end surface 12e and the second end surface 12f of the multilayer body 12A to the internal electrode layers 16 are shortened, such that moisture resistance is reduced. Furthermore, when the length WP in the short direction of a portion of each of the first protruding portions 40a facing the first end surface 12e and the length WP in the short direction of a portion of each of the second protruding portions 40b facing the second end surface 12f are about 80% or more with respect to the lengths $W_{gap}$ in the short direction of the first lateral surface-side outer layer portion 22a and the second lateral surface-side outer layer portion 22b, respectively, when the first protruding portion 40a and the second protruding portion 40b are provided by a masking jig, the unmasked region becomes small. Here, if the dimensions of the masking jig vary, the openings of the masking jig (i.e., the unmasked region) should be arranged at a position not over the internal electrode layers 16 in the original state, but the openings of the masking jig become narrower than the internal electrode layers 16, and the masking is performed even onto the internal electrode layers 16 which conventionally would have been polished. For this reason, due to the variation in dimension of the masking jig, a region where a portion of the internal electrode layers 16 is not polished is generated during the sandblasting process, and the first protruding portions 40a and the second protruding portions 40b do not exist in a portion of the internal electrode layers 16. As a result, the intrusion paths of the plating solution from the four corners of the first end surface 12e and the second end surface 12f of the multilayer body 12 to the internal electrode layers 16 are shortened, and moisture resistance is reduced.

The length LP of the first protruding portions 40a and the second protruding portions 40b in the length direction z of the multilayer body 12A is preferably, for example, about 0.1% or more and about 39% or less with respect to the thickness $L_{TOP}$ of the thickest portion of the base electrode layer 32 in the length direction z. With such a configuration, it is possible to improve moisture resistance and further reduce or prevent appearance defects. Furthermore, it is difficult to manufacture the first protruding portions 40a and the second protruding portion 40b, each having a length LP in the length direction z of the multilayer body 12A which is less than about 0.1% with respect to the thickness $L_{TOP}$ of the thickest portion in the length direction of the base electrode layer 32. Furthermore, when the length LP of the first protruding portions 40a and the second protruding portions 40b in the length direction z of the multilayer body 12A is greater than about 39% with respect to the thickness $L_{TOP}$ of the thickest portion in the length direction of the base electrode layer 32, the first protruding portions 40a and the second protruding portions 40b are likely to be exposed on the surface of the external electrode 30, and the probability of appearance defects increases.

Furthermore, the surfaces of the first end surface 12e and the second end surface 12f other than the first protruding portions 40a and the second protruding portions 40b preferably have a flat shape. When the surfaces of the first end surface 12e and the second end surface 12f other than the first protruding portions 40a and the second protruding portions 40b are flat, the surfaces of the base electrode layer 32 provided on the surfaces of the first end surface 12e and the second end surface 12f other than the first protruding portions 40a and the second protruding portions 40b can also be flat. As a result, the thickness at the central portion of the end surface of the base electrode layer 32 increases, such that it is possible to reduce or prevent the tombstone phenomenon generated when the thicknesses of the four corners of the end surface of the base electrode layer 32 are thin.

Second Preferred Embodiment

2. Multilayer Ceramic Capacitor

Figure 12:
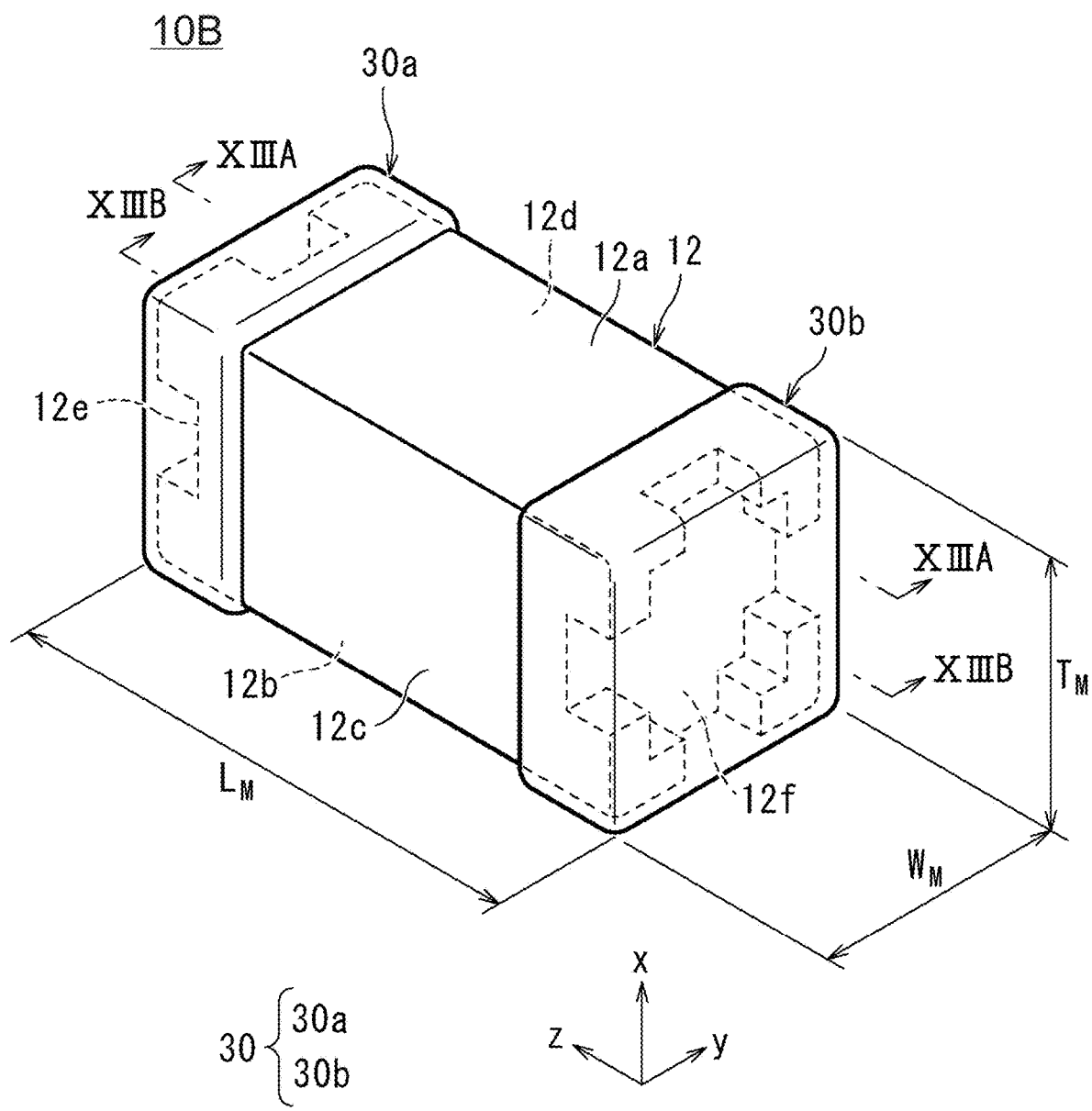
FIG. 12 is an external perspective view of an example of a multilayer ceramic capacitor according to a second preferred embodiment of the present invention.
Figure 13A:
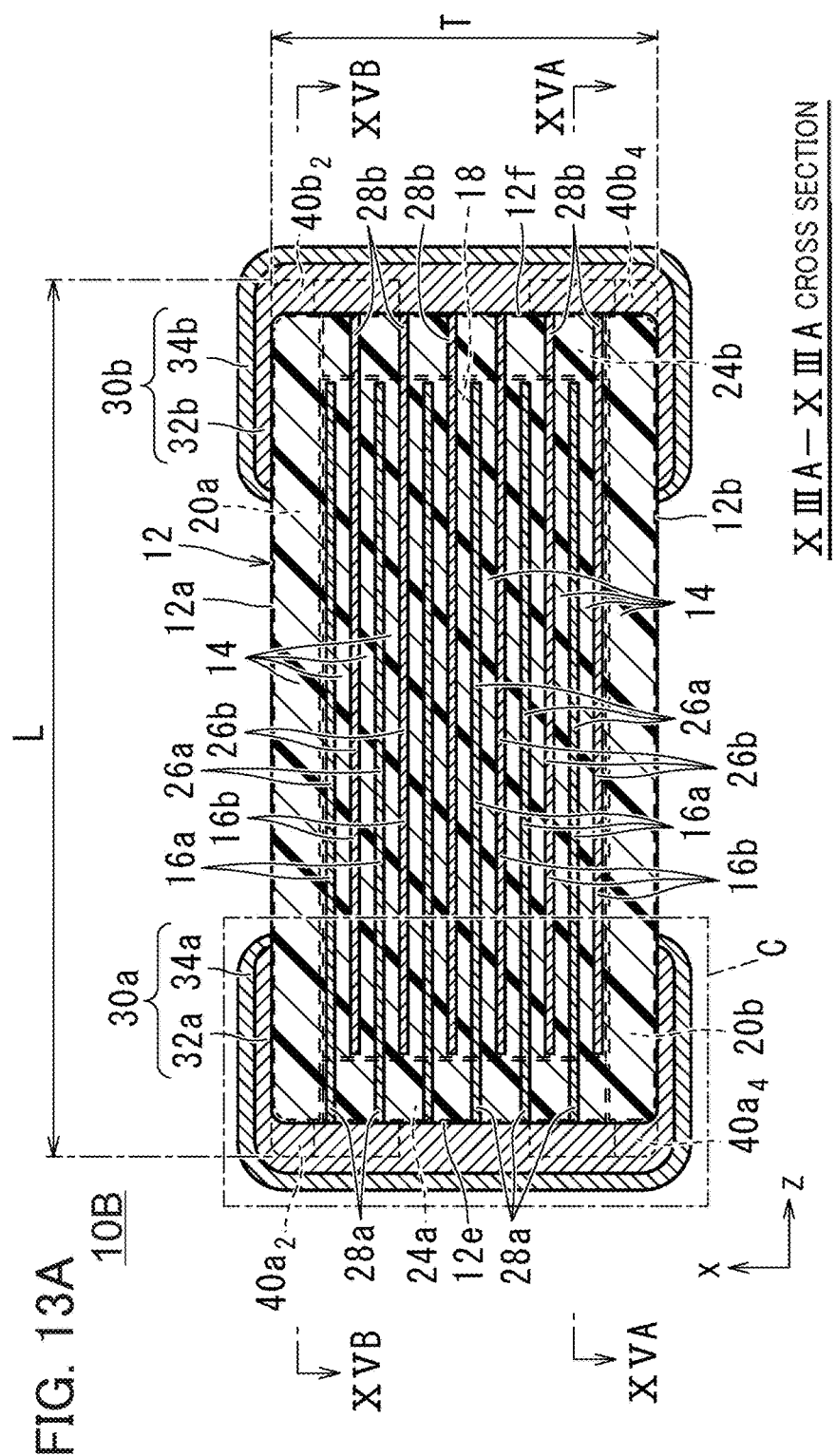
FIG. 13A is a cross-sectional view taken along the line XIIIA-XIIIA of FIG. 12.
Figure 13B:
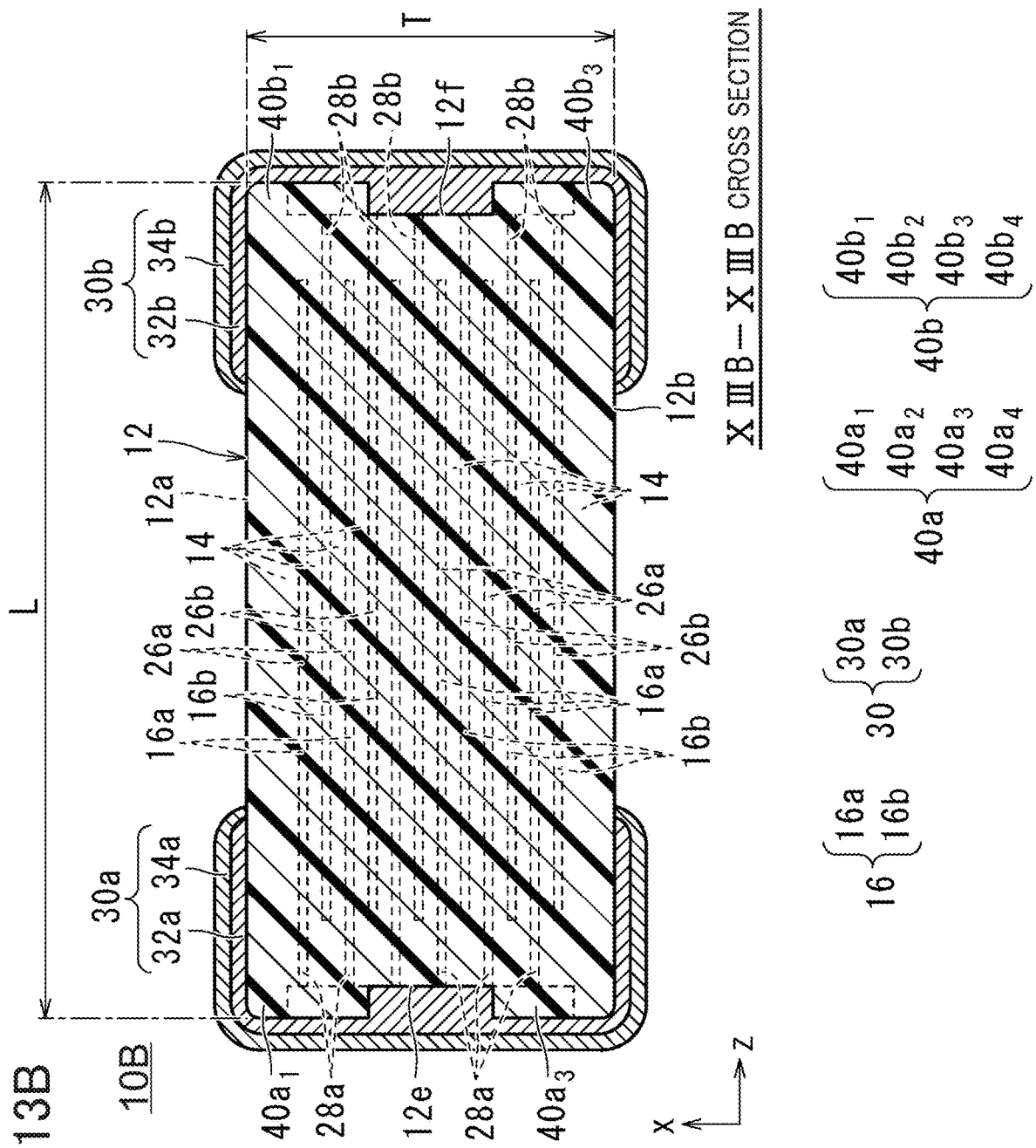
FIG. 13B is a cross-sectional view taken along the line XIIIB-XIIIB of FIG. 12.
Figure 14:
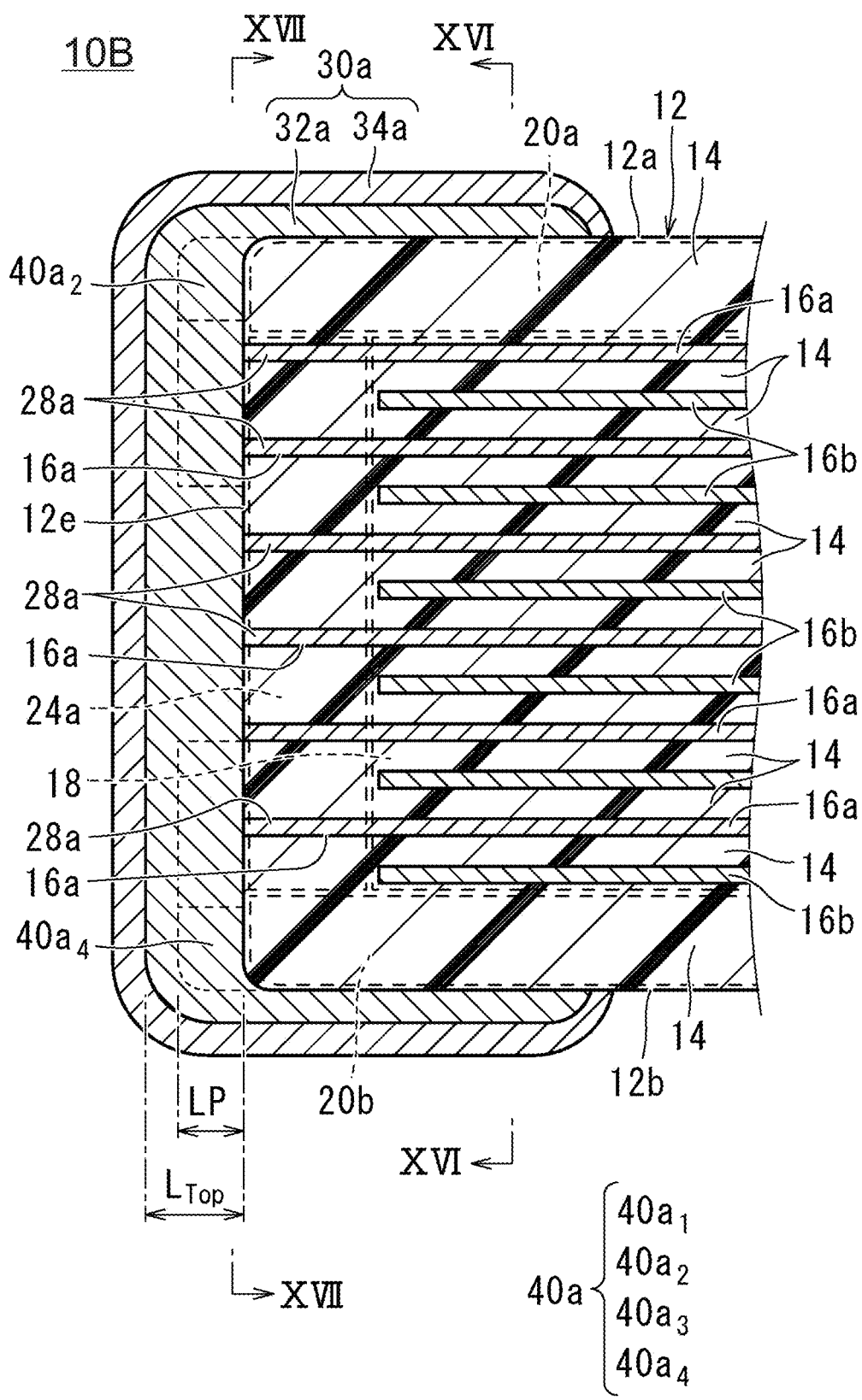
FIG. 14 is an enlarged view of a portion C in FIGS. 13A and 13b.
Figure 15B:
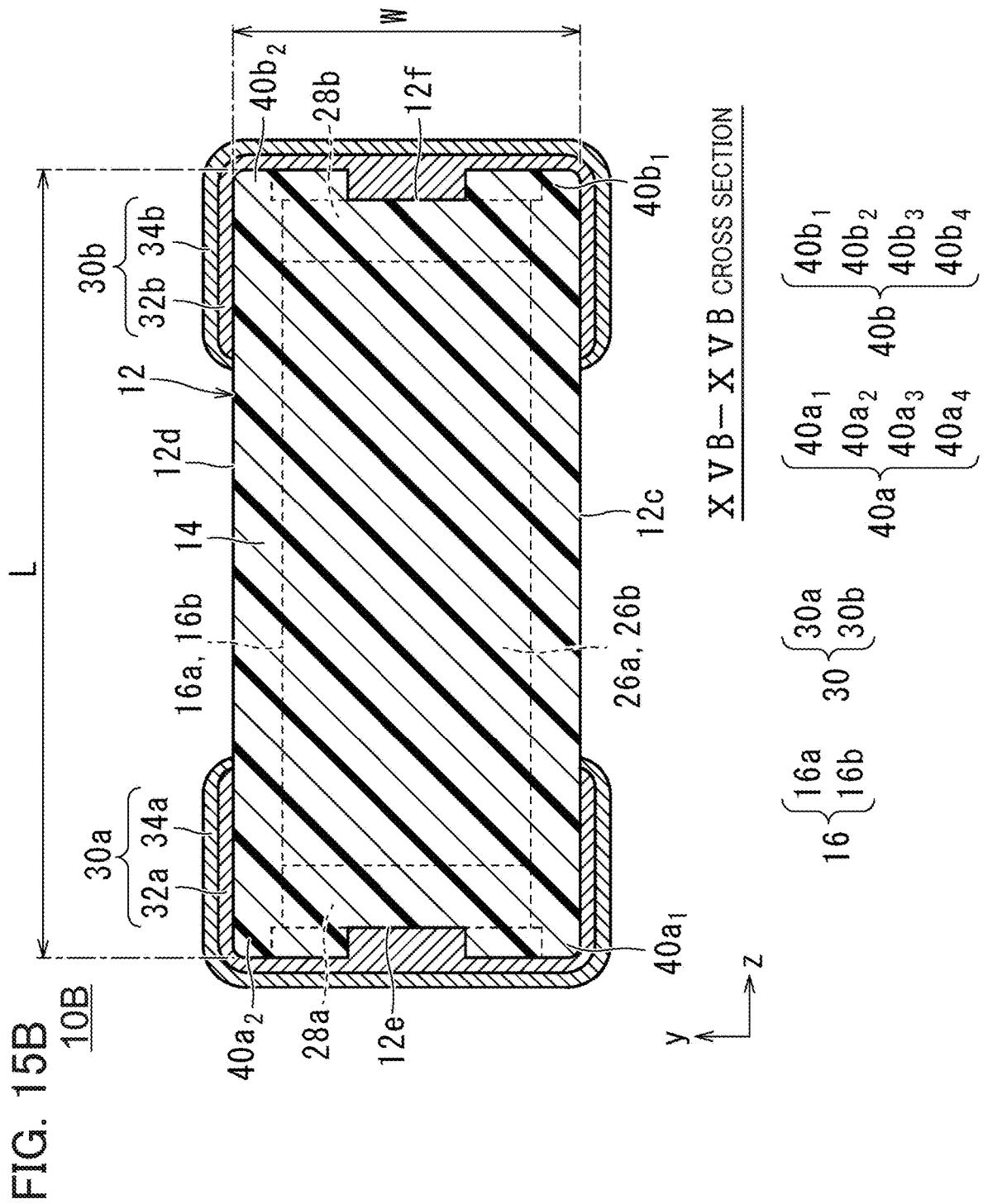
FIG. 15B is a cross-sectional view taken along the line XVB-XVB of FIG. 13A.
Figure 16:
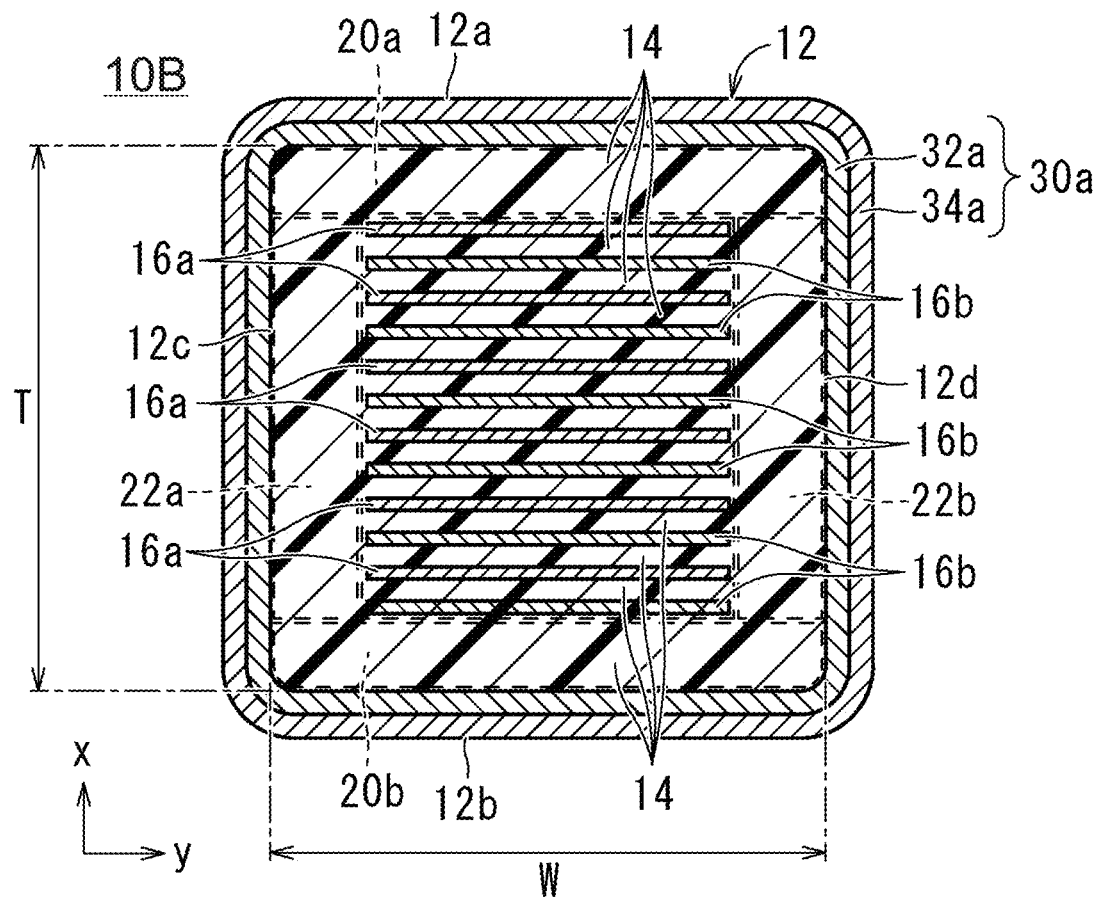
FIG. 16 is a cross-sectional view taken along the line XVI-XVI of FIG. 14.
Figure 17:
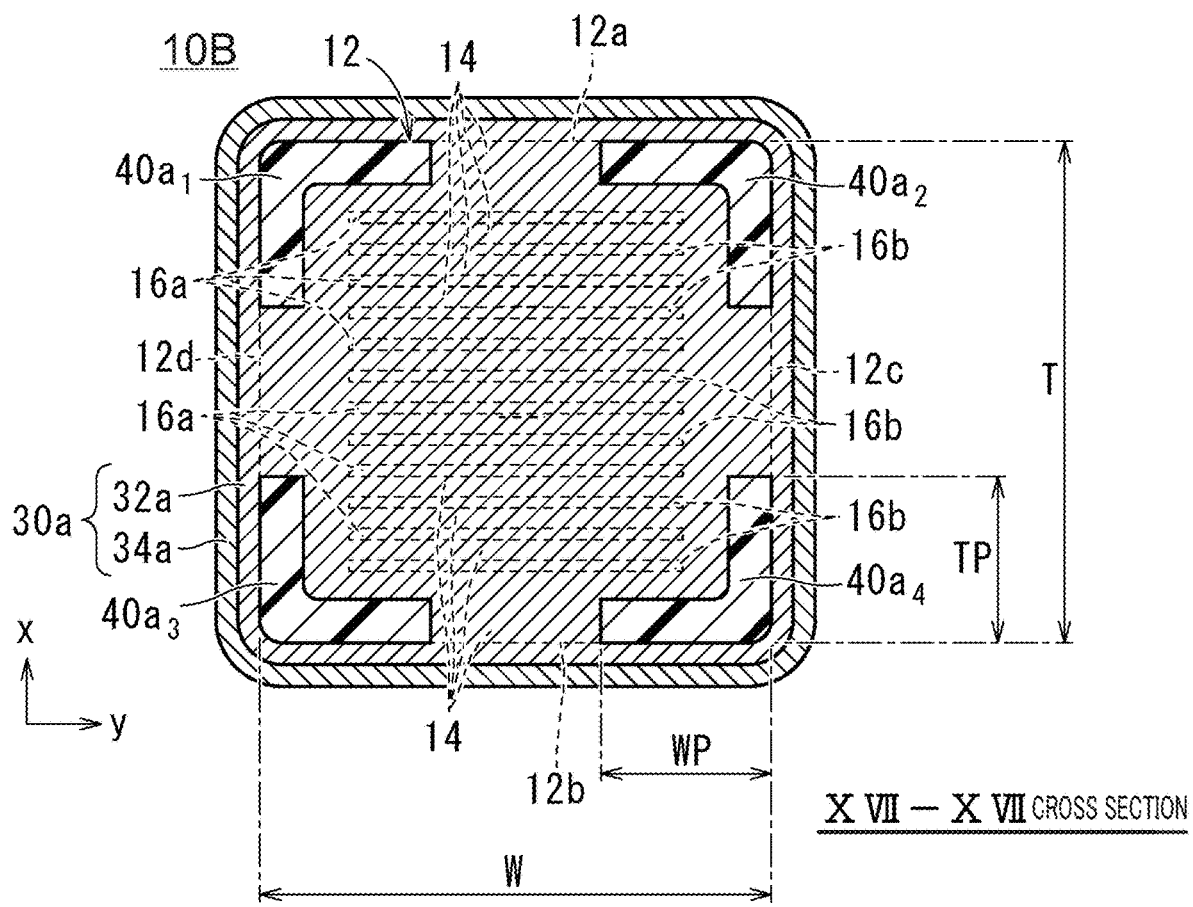
FIG. 17 is a cross-sectional view taken along the line XVII-XVII of FIG. 14.

A multilayer ceramic capacitor 10B according to a second preferred embodiment of the present invention will be described with reference to FIGS. 12 to 17. FIG. 12 is an external perspective view showing an example of a multilayer ceramic capacitor according to a second preferred embodiment of the present invention. FIG. 13A is a cross-sectional view taken along the line XIIIA-XIIIA of FIG. 12. FIG. 13B is a cross-sectional view taken along the line XIIIB-XIIIB of FIG. 12. FIG. 14 is an enlarged view of a portion C in FIGS. 13A and 13B. FIG. 15A is a cross-sectional view taken along the line XVA-XVA of FIG. 13A. FIG. 15B is a cross-sectional view taken along the line XVB-XVB of FIG. 13A. FIG. 16 is a cross-sectional view taken along the line XVI-XVI of FIG. 14. FIG. 17 is a cross-sectional view taken along the line XVII-XVII of FIG. 14.

The multilayer ceramic capacitor 10B according to the second preferred embodiment differs from the multilayer ceramic capacitor 10 according to the first preferred embodiment only in the shapes of the first protruding portion 40a and the second protruding portion 40b provided on the first end surface 12e and the second end surface 12f of the multilayer body 12. Therefore, components corresponding to those of the first preferred embodiment are denoted by the same reference numerals, and detailed descriptions thereof will be omitted.

As shown in FIGS. 12 to 17, the multilayer ceramic capacitor 10B includes a multilayer body 12B and external electrodes 30. The multilayer body 12B includes a configuration in which a plurality of dielectric layers 14 and internal electrode layers 16 are alternately laminated.

Multilayer Body

The multilayer body 12B includes a plurality of laminated dielectric layers 14, and includes a first main surface 12a and a second main surface 12b opposed to each other, a first lateral surface 12c and a second lateral surface 12d opposed to each other, and a first end surface 12e and a second end surface 12f opposed to each other. A direction between the first main surface 12a and the second main surface 12b is defined as an x direction, a direction between the first lateral surface 12c and the second lateral surface 12d is defined as a y direction, and a direction between the first end surface 12e and the second end surface 12f is defined as a z direction.

Dielectric Layer

The multilayer body 12B includes a plurality of dielectric layers 14 and a plurality of internal electrode layers 16. Furthermore, the multilayer body 12B includes an inner layer portion 18 in which the plurality of internal electrode layers 16 are opposed to each other.

The multilayer body 12B includes a first main surface-side outer layer portion 20a which is located adjacent to the first main surface 12a and includes a plurality of dielectric layers 14 located between the first main surface 12a, and the outermost surface of the inner layer portion 18 adjacent to the first main surface 12a and the extension line of the outermost surface. Similarly, the multilayer body 12B includes a second main surface-side outer layer portion 20b which is located adjacent to the second main surface 12b and includes a plurality of dielectric layers 14 located between the second main surface 12b, and the outermost surface of the inner layer portion 18 adjacent to the second main surface 12b and the extension line of the outermost surface.

The multilayer body 12B includes a first lateral surface-side outer layer portion 22a which is located adjacent to the first lateral surface 12c and includes a plurality of dielectric layers 14 located between the first lateral surface 12c, and the outermost surface of the inner layer portion 18 adjacent to the first lateral surface 12c and the extension line of the outermost surface. Similarly, the multilayer body 12B includes a second lateral surface-side outer layer portion 22b which is located adjacent to the second lateral surface 12d and includes a plurality of dielectric layers 14 located between the second lateral surface 12d, and the outermost surface of the inner layer portion 18 adjacent to the second lateral surface 12d and the extension line of the outermost surface.

The multilayer body 12B includes a first end surface-side outer layer portion 24a which is located adjacent to the first end surface 12e side and includes a plurality of dielectric layers 14 located between the first end surface 12e, and the outermost surface of the inner layer portion 18 adjacent to the first end surface 12e and the extension line of the outermost surface. Similarly, the multilayer body 12B includes a second end surface-side outer layer portion 24b which is located adjacent to the second end surface 12f and includes a plurality of dielectric layers 14 located between the second end surface 12f, and the outermost surface of the inner layer portion 18 adjacent to the second end surface 12f and the extension line of the outermost surface.

On the first end surface 12e, four first protruding portions 40a positioned at the four corners of the multilayer body 12B are provided. On the second end surface 12f, four second protruding portions 40b positioned at the four corners of the multilayer body 12B are provided. The first protruding portions 40a and the second protruding portions 40b do not overlap the inner layer portion 18. In other words, the first protruding portions 40a are positioned at the four corners of the first end surface 12e of the multilayer body 12B, and when viewed from the first end surface 12e, include an upper left first protruding portion 40a1, an upper right first protruding portion 40a2, a lower left first protruding portion 40a3, and a lower right first protruding portion 40a4. Similarly, the second protruding portions 40b are located at the four corners of the second end surface 12f of the multilayer body 12B, and when viewed from the second end surface 12f, include an upper left second protruding portion 40b1, an upper right second protruding portion 40b2, a lower left second protruding portion 40b3, and a lower right second protruding portion 40b4.

By providing the first protruding portion 40a and the second protruding portion 40b at the four corners of the first end surface 12e and the second end surface 12f of the multilayer body 12B, the first end surface 12e and the second end surface 12f of the multilayer body 12B each has a recessed shape in a side view. With such a configuration, when the multilayer body 12B is dipped in the electrically conductive paste, since the central portions of the first end surface 12e and the second end surface 12f are recessed, and therefore, the thickness of the electrically conductive paste at the central portions of the first end surface 12e and the second end surface 12f of the multilayer body 12B becomes thin due to the influence of the surface tension and the gravity. This makes it possible to planarize the outer surfaces of the external electrodes 30, such that it is possible to reduce or prevent the tombstone phenomenon.

Furthermore, since the first protruding portions 40a and the second protruding portions 40b are provided at the four corners of the first end surface 12e and the second end surface 12f of the multilayer body 12B respectively, it is possible to increase the thicknesses of the external electrodes 30 at the four corners of the first end surface 12e and the second end surface 12f of the multilayer body 12B by the thicknesses of the first protruding portion 40a and the second protruding portion 40b. Therefore, the intrusion paths of the plating solution from the four corners of the first end surface 12e and the second end surface 12f of the multilayer body 12B to the internal electrode layers 16 become long, and thus, it is possible to improve moisture resistance.

Furthermore, since the first protruding portions 40a and the second protruding portions 40b are provided at the four corners of the first end surface 12e and the second end surface 12f of the multilayer body 12B, an anchor effect between the external electrodes 30 and the multilayer body 12B is generated, and the adhesiveness between the multilayer body 12B and the external electrode 30 increases, such that a gap between the multilayer body 12B and the external electrode 30 is eliminated. Therefore, such a configuration achieves an advantageous effect of reducing or preventing moisture such as plating solution from entering. Here, even if moisture such as a plating solution enters, since the length LP in the length direction z of the first protruding portion 40a and the second protruding portion 40b is adjusted to an appropriate value at the four corners of the first end surface 12e and the second end surface 12f of the multilayer body 12B, the external electrodes 30 at the four corners of the first end surface 12e and the second end surface 12f of the multilayer body 12B are sufficiently thick by the length LP in the length direction z of the first protruding portion 40a and the second protruding portion 40b. Therefore, the intrusion paths of moisture such as a plating solution into the internal electrode layers 16 from the four corners of the first end surface 12e and the second end surface 12f of the multilayer body 12B become long, and thus, it is possible to improve moisture resistance. Therefore, by providing the first protruding portions 40a and the second protruding portions 40b at the four corners of the first end surface 12e and the second end surface 12f of the multilayer body 12B, it is possible to improve moisture resistance while reducing or preventing the tombstone phenomenon.

Furthermore, the first protruding portions 40a and the second protruding portions 40b of the multilayer ceramic capacitor 10B according to the present preferred embodiment may include portions not continuous with the first main surface-side outer layer portion 20a, the second main surface-side outer layer portion 20b, the first lateral surface-side outer layer portion 22a, and the second lateral surface-side outer layer portion 22b.

The length WP of each of the first protruding portions 40a and the second protruding portions 40b in the width direction y is preferably, for example, about 30% or more and about 45% or less with respect to the dimension W of the multilayer body 12B in the width direction y. In other words, in the above configuration, the first protruding portions 40a and the second protruding portions 40b each include a non-continuous portion in the width direction y. In other words, the first main surface-side outer layer portion 20a and the second main surface-side outer layer portion 20b each include a non-continuous portion. In a case where the first protruding portion 40a and the second protruding portion 40b are respectively continuous with the first main surface-side outer layer portion 20a and the second main surface-side outer layer portion 20b, when the external electrodes 30 are formed by a dipping method, since the first protruding portion 40a and the second protruding portion 40b are respectively provided continuously with the first main surface-side outer layer portion 20a and the second main surface-side outer layer portion 20b, there is no air leakage path which had existed in the first end surface 12e or the second end surface 12f of the multilayer body 12B before the multilayer body 12B was immersed in the electrically conductive paste. Therefore, when the first end surface 12e or the second end surface 12f of the multilayer body 12B is pulled up from the electrically conductive paste, pores remain in the electrically conductive paste adhered to the first end surface 12e or the second end surface 12f of the multilayer body 12B, a result of which pin holes are generated in the external electrodes 30 formed by firing the electrically conductive paste adhered to the first end surface 12e or the second end surface 12f of the multilayer body 12B. As in the present preferred embodiment, when the first protruding portion 40a and the second protruding portion 40b are configured to include portions which are not continuous with the first main surface-side outer layer portion 20a and the second main surface-side outer layer portion 20b, respectively, it is possible for air existing in the first end surface 12e or the second end surface 12f of the multilayer body 12B before the first end surface 12e or the second end surface 12f of the multilayer body 12B is immersed in the electrically conductive paste to be discharged from a region in which the first protruding portion 40a and the second protruding portion 40b are not provided at portions of the first main surface-side outer layer portion 20a and the second main surface-side outer layer portion 20b, respectively. Therefore, when the first end surface 12e or the second end surface 12f of the multilayer body 12B is pulled up from the electrically conductive paste, it is possible to reduce or prevent the remaining of the pores in the electrically conductive paste adhered to the first end surface 12e or the second end surface 12f of the multilayer body 12B. Furthermore, it is possible to reduce or prevent the generation of pinholes in the external electrodes 30 provided by firing the electrically conductive paste adhered to the first end surface 12e or the second end surface 12f of the multilayer body 12B.

The length TP of each of the first protruding portion 40a and the second protruding portion 40b in the height direction x of the multilayer body 12B is preferably, for example, about 30% or more and about 45% or less with respect to the dimension T of the multilayer body 12B in the height direction x. In other words, in the above configuration, the first protruding portion 40a and the second protruding portion 40b each include a non-continuous portion in the height direction x of the multilayer body 12B. In other words, the first lateral surface-side outer layer portion 22a and the second lateral surface-side outer layer portion 22b each include a non-continuous portion. In a case where the first protruding portion 40a and the second protruding portion 40b are respectively continuous with the first lateral surface-side outer layer portion 22a and the second lateral surface-side outer layer portion 22b, when the external electrodes 30 are formed by a dipping method, since the first protruding portion 40a and the second protruding portion 40b are respectively provided continuously with the first lateral surface-side outer layer portion 22a and the second lateral surface-side outer layer portion 22b, there is no air leakage path which had existed in the first end surface 12e or the second end surface 12f of the multilayer body 12B before the multilayer body 12B was immersed in the electrically conductive paste. Therefore, when the first end surface 12e or the second end surface 12f of the multilayer body 12B is pulled up from the electrically conductive paste, pores remain in the electrically conductive paste adhered to the first end surface 12e or the second end surface 12f of the multilayer body 12B, a result of which pin holes are generated in the external electrodes 30 formed by firing the electrically conductive paste adhered to the first end surface 12e or the second end surface 12f of the multilayer body 12B. As in the present preferred embodiment, when the first protruding portion 40a and the second protruding portion 40b are configured to include portions which are not continuous with the first lateral surface-side outer layer portion 22a and the second lateral surface-side outer layer portion 22b, respectively, it is possible for air existing in the first end surface 12e or the second end surface 12f of the multilayer body 12B before the first end surface 12e or the second end surface 12f of the multilayer body 12B is immersed in the electrically conductive paste to be discharged from a region in which the first protruding portion 40a and the second protruding portion 40b are not provided at portions of the first lateral surface-side outer layer portion 22a and the second lateral surface-side outer layer portion 22b, respectively. Therefore, when the first end surface 12e or the second end surface 12f of the multilayer body 12B is pulled up from the electrically conductive paste, it is possible to reduce or prevent the remaining pores in the electrically conductive paste adhered to the first end surface 12e or the second end surface 12f of the multilayer body 12B. Furthermore, it is possible to reduce or prevent the generation of pinholes in the external electrodes 30 provided by firing the electrically conductive paste adhered to the first end surface 12e or the second end surface 12f of the multilayer body 12B.

The length LP of the first protruding portions 40a and the second protruding portions 40b of the multilayer ceramic capacitor 10B according to the present preferred embodiment in the length direction z of the multilayer body 12B is preferably, for example, about 0.1% or more and about 39% or less with respect to the thickness $L_{TOP}$ of the thickest portion of the base electrode layer 32 in the length direction z. With the above configuration, it is possible to improve moisture resistance and further reduce or prevent appearance defects. Furthermore, it is difficult to manufacture the first protruding portions 40a and the second protruding portion 40b each having a length LP in the length direction z of the multilayer body 12B which is less than about 0.1% with respect to the thickness $L_{TOP}$ of the thickest portion in the length direction of the base electrode layer 32. Furthermore, when the length LP of the first protruding portions 40a and the second protruding portions 40b in the length direction z of the multilayer body 12B is greater than about 39% with respect to the thickness $L_{TOP}$ of the thickest portion in the length direction of the base electrode layer 32, the first protruding portions 40a and the second protruding portions 40b are likely to be exposed on the surface of the external electrode 30, and the probability of appearance defects increases.

Furthermore, the surfaces of the first end surface 12e and the second end surface 12f other than the first protruding portion 40a and the second protruding portion 40b of the multilayer ceramic capacitor 10B according to the present preferred embodiment preferably have a flat shape. When the surfaces of the first end surface 12e and the second end surface 12f other than the first protruding portions 40a and the second protruding portions 40b are flat, the surfaces of the base electrode layer 32 provided on the surfaces of the first end surface 12e and the second end surface 12f other than the first protruding portions 40a and the second protruding portions 40b can also be flat. As a result, the thickness at the central portion of the end surface of the base electrode layer 32 increases, such that it is possible to reduce or prevent the tombstone phenomenon generated when the thicknesses of the four corners of the end surface of the base electrode layer 32 are thin.

3. Experimental Example

Experimental Example 1

Multilayer ceramic capacitors shown in FIG. 1 or FIG. 7 were prepared according to the above-described non-limiting example of a manufacturing method, and the moisture resistance evaluation test and the appearance test were performed.
(1) Multilayer ceramic capacitors used in Examples and Comparative Examples
  (a) Dimensions of multilayer ceramic capacitors: $L_M \times W_M \times T_M$=about 3.2 mm×about 2.5 mm×about 2.5 mm
  (b) Dimensions of only multilayer body of multilayer ceramic capacitor: L×W×T=about 3.0 mm×about 2.4 mm×about 2.4 mm
  (c) Ceramic material of dielectric layer: $BaTiO_3$
  (d) Internal electrode layer: Ni
  (e) Capacitance: about 22 μF
  (f) Rated voltage: about 16 V
  (g) Configuration of external electrode
    (i) Base electrode layer: electrode layer containing conductive metal (Cu) and a glass component (Si)
Thickness at central portion of each end surface: about 120 μm (ii) Plated layer: two-layer formation of Ni plated layer and Sn plated layer
Thickness of Ni plated layer: about 2.5 μm
Thickness of Sn plated layer: about 5.5 μm
  (h) Size of protruding portion: Refer to Table 1
The moisture resistance evaluation test and appearance test were performed by the following methods.
(2) Moisture Resistance Evaluation Test (MRET)
The moisture resistance evaluation test was performed on 40,320 samples of the multilayer ceramic capacitor under the conditions of a temperature of about 85° C., humidity of about 85% RH, and applied voltage of about 16 V. After about 24 hours, the insulation resistance IR was measured. The insulation resistance IR was measured using an IR meter. In the measurement by the IR meter, the insulation resistance IR was measured by placing the measurement terminal of the IR meter on the external electrode of the multilayer ceramic capacitor. Samples each having an IR (Ω) value of about $10^6 \Omega$ or less were regarded as a defective product. Furthermore, as the judgment as to the success/failure of the moisture resistance evaluation test (JS/FMR), "○" (suggesting excellent) was shown when the number of defective products was zero, "Δ" (suggesting fair) was shown when the number of defective products was 0 or more and less than 50 ppm (0.005%), and "X" (suggesting failure) was shown when the number of defective products was 50 ppm (about 0.005%) or more. Table 1 shows the number of defective products per 40,320 samples of each sample number and the results of judgment as to success/failure of the moisture resistance evaluation test.
(3) Appearance Test (AT)
After the plated layer of the multilayer ceramic capacitor was formed, it was visually recognized using a magnifying mirror (loupe). A sample in which the protruding portion was exposed from the plated layer or a sample in which air bubbles were present on the surface of the plated layer was regarded as a defective product. Furthermore, as the judgment as to success/failure of the appearance test (JS/FAT), "○" (suggesting excellent) was shown when the number of defective products was zero, "Δ" was shown when the number of defective products was 0 or more and less than 5, and "X" was shown when the number of defective products was 5 or more. Table 1 shows the number of defective products per 2,500 samples of each sample number and the result of judgment as to success/failure of the appearance test.
(4) Experimental Results
The measured values of the multilayer ceramic capacitors prepared in Experimental Example 1, and the results of the moisture resistance evaluation test and the appearance test are shown in Table 1.

TABLE 1

| | Device size[mm] | | | Gap[μm] | | WP/Wgap | | TP/Tgap | | |
|---|---|---|---|---|---|---|---|---|---|---|
| | L | W | T | Wgap | Tgap | WP[μm] | (%) | TP[μm] | (%) | Ltop[μm] |
| Example1-1 | 3.0 | 2.4 | 2.4 | 230 | 150 | 23 | 10 | — | — | 63 |
| Example1-2 | 3.0 | 2.4 | 2.4 | 230 | 150 | 46 | 20 | — | — | 63 |
| Example1-3 | 3.0 | 2.4 | 2.4 | 230 | 150 | 69 | 30 | — | — | 63 |
| Example1-4 | 3.0 | 2.4 | 2.4 | 230 | 150 | 92 | 40 | — | — | 63 |
| Example1-5 | 3.0 | 2.4 | 2.4 | 230 | 150 | 138 | 60 | — | — | 63 |
| Example1-6 | 3.0 | 2.4 | 2.4 | 230 | 150 | 184 | 80 | — | — | 63 |
| Example1-7 | 3.0 | 2.4 | 2.4 | 230 | 150 | 207 | 90 | — | — | 63 |
| Example1-8 | 3.0 | 2.4 | 2.4 | 230 | 150 | — | — | 15 | 10 | 63 |
| Example1-9 | 3.0 | 2.4 | 2.4 | 230 | 150 | — | — | 30 | 20 | 63 |
| Example1-10 | 3.0 | 2.4 | 2.4 | 230 | 150 | — | — | 45 | 30 | 63 |

TABLE 1-continued

| | | | | | | | | | | |
|---|---|---|---|---|---|---|---|---|---|---|
| Example1-11 | 3.0 | 2.4 | 2.4 | 230 | 150 | — | — | 60 | 40 | 63 |
| Example1-12 | 3.0 | 2.4 | 2.4 | 230 | 150 | — | — | 90 | 60 | 63 |
| Example1-13 | 3.0 | 2.4 | 2.4 | 230 | 150 | — | — | 120 | 80 | 63 |
| Example1-14 | 3.0 | 2.4 | 2.4 | 230 | 150 | — | — | 135 | 90 | 63 |
| Example1-15 | 3.0 | 2.4 | 2.4 | 230 | 150 | 138 | 60 | — | — | 63 |
| Example1-16 | 3.0 | 2.4 | 2.4 | 230 | 150 | 138 | 60 | — | — | 63 |
| Example1-17 | 3.0 | 2.4 | 2.4 | 230 | 150 | 138 | 60 | — | — | 63 |
| Example1-18 | 3.0 | 2.4 | 2.4 | 230 | 150 | 138 | 60 | — | — | 63 |
| Example1-19 | 3.0 | 2.4 | 2.4 | 230 | 150 | 138 | 60 | — | — | 63 |
| Example1-20 | 3.0 | 2.4 | 2.4 | 230 | 150 | 138 | 60 | — | — | 63 |
| Example1-21 | 3.0 | 2.4 | 2.4 | 230 | 150 | — | — | 90 | 60 | 63 |
| Example1-22 | 3.0 | 2.4 | 2.4 | 230 | 150 | — | — | 90 | 60 | 63 |
| Example1-23 | 3.0 | 2.4 | 2.4 | 230 | 150 | — | — | 90 | 60 | 63 |
| Example1-24 | 3.0 | 2.4 | 2.4 | 230 | 150 | — | — | 90 | 60 | 63 |
| Example1-25 | 3.0 | 2.4 | 2.4 | 230 | 150 | — | — | 90 | 60 | 63 |
| Example1-26 | 3.0 | 2.4 | 2.4 | 230 | 150 | — | — | 90 | 60 | 63 |
| Comp Example1-1 | 3.0 | 2.4 | 2.4 | 230 | 150 | 0 | 0 | 0 | 0 | 63 |
| Comp Example1-2 | 3.0 | 2.4 | 2.4 | 230 | 150 | 230 | 100 | — | — | 63 |
| Comp Example1-3 | 3.0 | 2.4 | 2.4 | 230 | 150 | 460 | 200 | — | — | 63 |
| Comp Example1-4 | 3.0 | 2.4 | 2.4 | 230 | 150 | — | — | 150 | 100 | 63 |
| Comp Example1-5 | 3.0 | 2.4 | 2.4 | 230 | 150 | — | — | 300 | 200 | 63 |
| Comp Example1-6 | 3.0 | 2.4 | 2.4 | 230 | 150 | 230 | 100 | — | — | 63 |
| Comp Example1-7 | 3.0 | 2.4 | 2.4 | 230 | 150 | — | — | 150 | 100 | 63 |

| | LP [µm] | LP/Ltop(%) | MRET | JS/FMR | AT | JS/FAT | Comprehensive judgment |
|---|---|---|---|---|---|---|---|
| Example1-1 | 12.6 | 20 | 2/40320 | Δ | 0/2500 | ○ | Δ |
| Example1-2 | 12.6 | 20 | 1/40320 | Δ | 0/2500 | ○ | Δ |
| Example1-3 | 12.6 | 20 | 1/40320 | Δ | 0/2500 | ○ | Δ |
| Example1-4 | 12.6 | 20 | 0/40320 | ○ | 0/2500 | ○ | ○ |
| Example1-5 | 12.6 | 20 | 0/40320 | ○ | 0/2500 | ○ | ○ |
| Example1-6 | 12.6 | 20 | 0/40320 | ○ | 0/2500 | ○ | ○ |
| Example1-7 | 12.6 | 20 | 2/40320 | Δ | 0/2500 | ○ | Δ |
| Example1-8 | 12.6 | 20 | 2/40320 | Δ | 0/2500 | ○ | Δ |
| Example1-9 | 12.6 | 20 | 1/40320 | Δ | 0/2500 | ○ | Δ |
| Example1-10 | 12.6 | 20 | 1/40320 | Δ | 0/2500 | ○ | Δ |
| Example1-11 | 12.6 | 20 | 0/40320 | ○ | 0/2500 | ○ | ○ |
| Example1-12 | 12.6 | 20 | 0/40320 | ○ | 0/2500 | ○ | ○ |
| Example1-13 | 12.6 | 20 | 0/40320 | ○ | 0/2500 | ○ | ○ |
| Example1-14 | 12.6 | 20 | 2/40320 | Δ | 0/2500 | ○ | Δ |
| Example1-15 | 0.063 | 0.1 | 0/40320 | ○ | 0/2500 | ○ | ○ |
| Example1-16 | 0.63 | 1 | 0/40320 | ○ | 0/2500 | ○ | ○ |
| Example1-17 | 4.41 | 7 | 0/40320 | ○ | 0/2500 | ○ | ○ |
| Example1-18 | 15.75 | 25 | 0/40320 | ○ | 0/2500 | ○ | ○ |
| Example1-19 | 24.57 | 39 | 0/40320 | ○ | 0/2500 | ○ | ○ |
| Example1-20 | 37.8 | 60 | 0/40320 | ○ | 3/2500 | Δ | Δ |
| Example1-21 | 0.063 | 0.1 | 0/40320 | ○ | 0/2500 | ○ | ○ |
| Example1-22 | 0.63 | 1 | 0/40320 | ○ | 0/2500 | ○ | ○ |
| Example1-23 | 4.41 | 7 | 0/40320 | ○ | 0/2500 | ○ | ○ |
| Example1-24 | 15.75 | 25 | 0/40320 | ○ | 0/2500 | ○ | ○ |
| Example1-25 | 24.57 | 39 | 0/40320 | ○ | 0/2500 | ○ | ○ |
| Example1-26 | 37.8 | 60 | 0/40320 | ○ | 3/2500 | Δ | Δ |
| Comp Example1-1 | 0 | 0 | 9/40320 | × | 0/2500 | ○ | × |
| Comp Example1-2 | 12.6 | 20 | 4/40320 | × | 0/2500 | ○ | × |
| Comp Example1-3 | 12.6 | 20 | 5/40320 | × | 0/2500 | ○ | × |
| Comp Example1-4 | 24 | 20 | 5/40320 | × | 0/2500 | ○ | × |
| Comp Example1-5 | 24 | 20 | 6/40320 | × | 0/2500 | ○ | × |
| Comp Example1-6 | 60 | 60 | 4/40320 | × | 8/2500 | × | × |
| Comp Example1-7 | 60 | 50 | 5/40320 | × | 7/2500 | × | × |

As shown in Table 1, the comparison between each Example and Comparative Example (Comp Example) 1-1 revealed that moisture resistance could be improved by providing protruding portions on each end surface of the multilayer body. Furthermore, when each Example and Comparative Examples 1-2 to 1-5 were compared, it was discovered that moisture resistance could be improved by providing the protruding portions that did not overlap the inner layer portion when the multilayer body was viewed from the end surface. In particular, in a case where the protruding portions were provided on each main surface-side outer layer portion (Examples 1-4 to 1-6), moisture resistance could be further improved by setting the length of each of the protruding portions in the short direction to about 40% or more and about 80% or less with respect to each main surface-side outer layer portion, and appearance defects did not occur. Furthermore, in a case where the protruding portions were provided on each lateral surface-side outer layer portion (Examples 1-11 to 1-13), moisture resistance could be further improved by setting the length of each of the protruding portions in the short direction to about 40% or more and about 80% or less with respect to each lateral surface-side outer layer portion, and appearance defects did not occur. Furthermore, when each Example was compared with Comparative Examples 1-6 and 1-7, moisture resistance could be improved and appearance defects did not occur when the length of each of the protruding portions provided in the multilayer body in the length direction was set to about 50% or less with respect to the length of the base electrode layer in the length direction. In particular, when the length of each of the protruding portions provided on the multilayer body in the length direction was about 0.1% or more and about 39% or less with respect to the length of the base electrode layer in the length direction, moisture resistance could be further improved and appearance defects did not occur.

Experimental Example 2

Multilayer ceramic capacitors shown in FIG. 12 were prepared according to the above-described non-limiting example of a manufacturing method, and the moisture resistance evaluation test and the appearance test were performed.

Thickness of Ni plated layer: about 2.5 μm Thickness of Sn plated layer: about 5.5 μm (h) Size of protruding portion: refer to Table 2.

The moisture resistance evaluation test and appearance test were performed in the same manner as in Experimental Example 1.

(2) Experimental Results

The measured values of the multilayer ceramic capacitors prepared in Experimental Example 2, and the results of the moisture resistance evaluation test and the appearance test are shown in Table 2.

TABLE 2

| | Device size[mm] | | | Gap[μm] | | | | | | |
|---|---|---|---|---|---|---|---|---|---|---|
| | L | W | T | Wgap | Tgap | WP[mm] | WP/W(%) | TP[mm] | TP/Tgap(%) | Ltop[μm] |
| Example2-1 | 3.0 | 2.4 | 2.4 | 230 | 150 | 0.12 | 5 | 0.12 | 5 | 63 |
| Example2-2 | 3.0 | 2.4 | 2.4 | 230 | 150 | 0.24 | 10 | 0.24 | 10 | 63 |
| Example2-3 | 3.0 | 2.4 | 2.4 | 230 | 150 | 0.46 | 20 | 0.46 | 20 | 63 |
| Example2-4 | 3.0 | 2.4 | 2.4 | 230 | 150 | 0.72 | 30 | 0.72 | 30 | 63 |
| Example2-5 | 3.0 | 2.4 | 2.4 | 230 | 150 | 0.912 | 38 | 0.912 | 38 | 63 |
| Example2-6 | 3.0 | 2.4 | 2.4 | 230 | 150 | 1.06 | 45 | 1.06 | 45 | 63 |
| Example2-7 | 3.0 | 2.4 | 2.4 | 230 | 150 | 1.152 | 48 | 1.152 | 48 | 63 |
| Example2-8 | 3.0 | 2.4 | 2.4 | 230 | 150 | 0.912 | 38 | 0.912 | 38 | 63 |
| Example2-9 | 3.0 | 2.4 | 2.4 | 230 | 150 | 0.912 | 38 | 0.912 | 38 | 63 |
| Example2-10 | 3.0 | 2.4 | 2.4 | 230 | 150 | 0.912 | 38 | 0.912 | 38 | 63 |
| Example2-11 | 3.0 | 2.4 | 2.4 | 230 | 150 | 0.912 | 38 | 0.912 | 38 | 63 |
| Example2-12 | 3.0 | 2.4 | 2.4 | 230 | 150 | 0.912 | 38 | 0.912 | 38 | 63 |
| Example2-13 | 3.0 | 2.4 | 2.4 | 230 | 150 | 0.912 | 38 | 0.912 | 38 | 63 |
| Comp Example2-1 | 3.0 | 2.4 | 2.4 | 250 | 150 | 0 | 0 | 0 | 0 | 63 |
| Comp Example2-2 | 3.0 | 2.4 | 2.4 | 230 | 150 | 1.2 | 50 | 1.2 | 50 | 63 |

| | LP[μm] | LP/Ltop (%) | MRET | JS/FMR | AT | JS/FAT | Comprehensive judgment |
|---|---|---|---|---|---|---|---|
| Example2-1 | 24 | 20 | 2/40320 | Δ | 0/2500 | ○ | Δ |
| Example2-2 | 12.6 | 20 | 1/40320 | Δ | 0/2500 | ○ | Δ |
| Example2-3 | 12.6 | 20 | 1/40320 | Δ | 0/2500 | ○ | Δ |
| Example2-4 | 12.0 | 20 | 0/40320 | ○ | 0/2500 | ○ | ○ |
| Example2-5 | 12.6 | 20 | 0/40320 | ○ | 0/2500 | ○ | ○ |
| Example2-6 | 12.6 | 20 | 0/40320 | ○ | 0/2500 | ○ | ○ |
| Example2-7 | 12.6 | 20 | 0/40320 | ○ | 4/2500 | Δ | Δ |
| Example2-8 | 0.063 | 0.1 | 0/40320 | ○ | 0/2500 | ○ | ○ |
| Example2-9 | 0.63 | 1 | 0/40320 | ○ | 0/2500 | ○ | ○ |
| Example2-10 | 4.41 | 7 | 0/40320 | ○ | 0/2500 | ○ | ○ |
| Example2-11 | 15.75 | 25 | 0/40320 | ○ | 0/2500 | ○ | ○ |
| Example2-12 | 24.57 | 39 | 0/40320 | ○ | 0/2500 | ○ | ○ |
| Example2-13 | 37.8 | 60 | 0/40320 | ○ | 2/2500 | Δ | Δ |
| Comp Example2-1 | 0 | 0 | 8/40320 | x | 0/2500 | ○ | x |
| Comp Example2-2 | 31.5 | 50 | 4/40320 | x | 9/2500 | x | x |

(1) Multilayer Ceramic Capacitors Used in Examples and Comparative Examples
  (a) Dimensions of multilayer ceramic capacitor: $L_M \times W_M \times T_M$=about 3.2 mm×about 2.5 mm×about 2.5 mm
  (b) Dimensions of only multilayer body of multilayer ceramic capacitor: L×W×T=about 3.0 mm×about 2.4 mm×about 2.4 mm
  (c) Ceramic material of dielectric layer: $BaTiO_3$
  (d) Internal electrode layer: Ni
  (e) Capacitance: about 22 μF
  (f) Rated voltage: about 16 V
  (g) Configuration of external electrode
    (i) Base electrode layer: electrode layer containing a conductive metal (Cu) and a glass component (Si)
  Thickness at central portion of each end surface: about 120 μm
    (ii) Plated layer: two-layer formation of Ni plated layer and Sn plated layer As shown in Table 2, the comparison between each Example and Comparative Example 2-1 revealed that moisture resistance could be improved by providing protruding portions at four corners on the end surfaces of the multilayer body. In comparison between each Example and Comparative Example 2-2, it was discovered that moisture resistance could be improved and appearance defects did not occur by providing a portion not continuous with each main surface-side outer layer portion or each lateral surface-side outer layer portion when viewed from the end surface of the multilayer body. In particular, moisture resistance could be further improved and appearance defects did not occur by setting the length of each protruding portion provided in the multilayer body in the height direction to about 30% or more and about 45% or less with respect to the dimension T in the height direction of the multilayer body and setting the length of each protruding portion in the width direction to about 30% or more and about 45% or less with respect to the dimension W in the width direction of the multilayer body.

Furthermore, by setting the length in the length direction of each protruding portion provided in the multilayer body to about 0.1% or more and about 39% or less with respect to the length in the length direction of the base electrode layer, moisture resistance could be further improved and appearance defects did not occur.

From the above results, in the multilayer bodies 12 and 12A of the multilayer ceramic capacitors 10 and 10A according to preferred embodiments of the present invention, on the first end surface 12e, the first protruding portions 40a are opposed to each other and extend along at least two surfaces of the first main surface 12a and the second main surface 12b or the first lateral surface 12c and the second lateral surface 12d at portions where the first main surface-side outer layer portion 20a and the second main surface-side outer layer portion 20b or the first lateral surface-side outer layer portion 22a and the second lateral surface-side outer layer portion 22b are located and, on the second end surface 12f, the second protruding portions 40b are opposed to each other and extend along at least two surfaces of the first main surface 12a and the second main surface 12b or the first lateral surface 12c and the second lateral surface 12d at portions where the first main surface-side outer layer portion 20a and the second main surface-side outer layer portion 20b or the first lateral surface-side outer layer portion 22a and the second lateral surface-side outer layer portion 22b are located, and the first protruding portions 40a and the second protruding portions 40b do not overlap the inner layer portion 18, such that it is possible to improve moisture resistance while reducing or preventing the tombstone phenomenon.

More specifically, by providing the first protruding portions 40a and the second protruding portions 40b at the four corners of the first end surface 12e and the second end surface 12f of the multilayer body 12, 12A, the first end surface 12e and the second end surface 12f of the multilayer bodies 12 and 12A each has a recessed shape in a side view or a plan view. With such a configuration, when the multilayer body 12 is dipped with the electrically conductive paste, since the central portions of the first end surface 12e and the second end surface 12f are recessed, the thickness of the electrically conductive paste at the central portions of the first end surface 12e and the second end surface 12f of the multilayer body becomes thin due to the influence of surface tension and gravity, and the outer surfaces of the external electrodes 30 can be planarized, such that it is possible to reduce or prevent the tombstone phenomenon.

Furthermore, since the first protruding portions 40a and the second protruding portions 40b are provided at the four corners of the first end surface 12e and the second end surface 12f of the multilayer bodies 12 and 12A, it is possible to increase the thickness of the external electrode 30 at the four corners of the first end surface 12e and the second end surface 12f of the multilayer bodies 12 and 12A by the thickness of the first protruding portions 40a and the second protruding portions 40b. Therefore, the intrusion paths of the plating solution from the four corners of the first end surface 12e and the second end surface 12f of the multilayer bodies 12 and 12A to the internal electrode layers 16 become long, such that it is possible to improve moisture resistance.

Furthermore, since the first protruding portions 40a and the second protruding portions 40b are provided at the four corners of the first end surface 12e and the second end surface 12f of the multilayer bodies 12 and 12A, an anchor effect between the external electrode 30 and the multilayer bodies 12 and 12A is generated, and the adhesiveness between the multilayer bodies 12 and 12A and the external electrode 30 increases, such that gaps between the multilayer bodies 12 and 12A and the external electrode 30 are eliminated. Therefore, such a configuration achieves an advantageous effect of reducing or preventing moisture such as the plating solution from entering. Here, even if moisture such as the plating solution enters, since the length LP in the length direction z of the first protruding portion 40a and the second protruding portion 40b is adjusted to an appropriate value at the four corners of the first end surface 12e and the second end surface 12f of the multilayer bodies 12 and 12A, the external electrodes 30 at the four corners of the first end surface 12e and the second end surface 12f of the multilayer bodies 12 and 12A are sufficiently thick by the length in the length direction z of the first protruding portion 40a and the second protruding portion 40b. Therefore, the intrusion paths of moisture such as the plating solution into the internal electrode layers 16 from the four corners of the first end surface 12e and the second end surface 12f of the multilayer bodies 12 and 12A become long, and thus, it is possible to improve moisture resistance.

In the multilayer ceramic capacitors 10 and 10A according to preferred embodiments of the present invention, the length in the longitudinal direction of a portion of each of the first protruding portions 40a facing the first end surface 12e and the length in the longitudinal direction of a portion of each of the second protruding portions 40b facing the second end surface 12f are preferably equal or substantially equal to the length of a side of the first main surface 12a or the second main surface 12b, and a side of the first lateral surface 12c or the second lateral surface 12d. With such a configuration, a path through which moisture such as the plating solution enters the internal electrode layers 16 from the four corners of the first end surface 12e and the second end surface 12f of the multilayer bodies 12 and 12A becomes long, and thus, it is possible to improve moisture resistance.

Furthermore, in the multilayer ceramic capacitors 10 and 10A according to preferred embodiments of the present invention, the length in the short direction of a portion of each of the first protruding portions 40a facing the first end surface 12e and the length in the short direction of a portion of each of the second protruding portions 40b facing the second end surface 12f are preferably, for example, about 40% or more and about 80% or less of the length in the short direction of the first main surface-side outer layer portion 20a and the second main surface-side outer layer portion 20b or the first lateral surface-side outer layer portion 22a and the second lateral surface-side outer layer portion 22b facing the first end surface 12e or the second end surface 12f. With such a configuration, it is possible to improve moisture resistance and further reduce appearance defects. Furthermore, when the length in the short direction of a portion of each of the first protruding portions 40a facing the first end surface 12e and the length in the short direction of a portion of each of the second protruding portions 40b facing the second end surface 12f are less than about 40% the length of the first main surface-side outer layer portion 20a and the second main surface-side outer layer portion 20b in the short direction, since the thicknesses of the external electrodes 30 in the region near the edge sides of the first lateral surface 12c and the second lateral surface 12d or in the region near the edge sides of the first main surface 12a and the second main surface 12b cannot be sufficiently ensured, the intrusion paths of the plating solution from the four corners of the first end surface 12e and the second end surface 12f of the multilayer body 12A to the internal electrode layers 16 are shortened, such that moisture resistance is reduced. Furthermore, when the length in the short direction of a portion of each of the first protruding portions 40a facing the first end surface 12e and the length in the short direction of a portion of each of the second protruding portions 40b facing the second end surface 12f are about 80% or more with respect to the lengths in the short direction of the first main surface-side outer layer portion 20a and the second main surface-side outer layer portion 20b, respectively, when the first protruding portion 40a and the second protruding portion 40b are provided by a masking jig, the unmasked region becomes small. Here, if the dimensions of the masking jig vary, the openings of the masking jig (i.e., the unmasked region) should be arranged at a position not over the internal electrode layers 16 in the original state, but the openings of the masking jig become narrower than the internal electrode layers 16, and the masking is performed even onto the internal electrode layers 16 which conventionally would have been polished. For this reason, due to the variation in dimension of the masking jig, a region where a portion of the internal electrode layers 16 is not polished is generated during the sandblasting process, and the first protruding portions 40a and the second protruding portions 40b do not exist in a portion of the internal electrode layers 16. As a result, the intrusion paths of the plating solution from the four corners of the first end surface 12e and the second end surface 12f of the multilayer body 12 to the internal electrode layers 16 are shortened, and moisture resistance is reduced.

In the multilayer ceramic capacitors 10 and 10A according to preferred embodiments of the present invention, the length of the first protruding portions 40a and the second protruding portions 40b in the length direction of the multilayer bodies 12 and 12A is preferably, for example, about 0.1% or more and about 39% or less with respect to the thickness $L_{TOP}$ of the thickest portion in the length direction of the base electrode layer 32. With such a configuration, it is possible to improve moisture resistance and further reduce appearance defects. Furthermore, it is difficult to manufacture the first protruding portions 40a and the second protruding portion 40b each having a length LP in the length direction z of the multilayer body 12 which is less than about 0.1% with respect to the thickness $L_{TOP}$ of the thickest portion in the length direction of the base electrode layer 32. Furthermore, when the length LP of the first protruding portions 40a and the second protruding portions 40b in the length direction z of the multilayer body 12 is greater than about 39% with respect to the thickness $L_{TOP}$ of the thickest portion in the length direction of the base electrode layer 32, the first protruding portions 40a and the second protruding portions 40b are likely to be exposed on the surface of the external electrode 30, and the probability of appearance defects increases.

Furthermore, in the multilayer ceramic capacitors 10 and 10A according to preferred embodiments of the present invention, the surfaces of the first end surface 12e and the second end surface 12f other than the first protruding portions 40a and the second protruding portions 40b preferably each have a flat shape. With such a configuration, the thickness at the central portion of the end surface of the base electrode layer 32 increases, such that it is possible to reduce or prevent the tombstone phenomenon generated when the thicknesses of the four corners of the end surface of the base electrode layer 32 are thin.

In the multilayer ceramic capacitor 10B according to a preferred embodiment of the present invention, on the first end surface 12e, four first protruding portions 40a positioned at the four corners of the multilayer body 12B are provided. On the second end surface 12f, four second protruding portions 40b positioned at the four corners of the multilayer body 12B are provided. The first protruding portions 40a and the second protruding portions 40b do not overlap the inner layer portion 18. By providing the first protruding portion 40a and the second protruding portion 40b at the four corners of the first end surface 12e and the second end surface 12f of the multilayer body 12B, the first end surface 12e and the second end surface 12f of the multilayer body 12B each has a recessed shape in a side view. With such a configuration, when the multilayer body 12B is dipped in the electrically conductive paste, since the central portions of the first end surface 12e and the second end surface 12f are recessed, the thickness of the electrically conductive paste at the central portions of the first end surface 12e and the second end surface 12f of the multilayer body 12B becomes thin due to the influence of the surface tension and the gravity. This makes it possible to planarize the outer surfaces of the external electrodes 30, such that it is possible to reduce or prevent the tombstone phenomenon.

Furthermore, since the first protruding portions 40a and the second protruding portions 40b are provided at the four corners of the first end surface 12e and the second end surface 12f of the multilayer body 12B respectively, it is possible to increase the thicknesses of the external electrodes 30 at the four corners of the first end surface 12e and the second end surface 12f of the multilayer body 12B by the thicknesses of the first protruding portion 40a and the second protruding portion 40b. Therefore, the intrusion paths of the plating solution from the four corners of the first end surface 12e and the second end surface 12f of the multilayer body 12B to the internal electrode layers 16 become long, and thus, it is possible to improve moisture resistance.

Furthermore, since the first protruding portions 40a and the second protruding portions 40b are provided at the four corners of the first end surface 12e and the second end surface 12f of the multilayer body 12B, an anchor effect between the external electrodes 30 and the multilayer body 12B is generated, and the adhesiveness between the multilayer body 12B and the external electrode 30 increases, such that a gap between the multilayer body 12B and the external electrode 30 is eliminated. Therefore, such a configuration achieves an advantageous effect of reducing or preventing moisture such as plating solution from entering. Here, even if moisture such as a plating solution enters, since the length LP in the length direction z of the first protruding portion 40a and the second protruding portion 40b is adjusted to an appropriate value at the four corners of the first end surface 12e and the second end surface 12f of the multilayer body 12B, the external electrodes 30 at the four corners of the first end surface 12e and the second end surface 12f of the multilayer body 12B are sufficiently thick by the length LP in the length direction z of the first protruding portion 40a and the second protruding portion 40b. Therefore, the intrusion paths of moisture such as a plating solution into the internal electrode layers 16 from the four corners of the first end surface 12e and the second end surface 12f of the multilayer body 12B become long, and thus, it is possible to improve moisture resistance. Therefore, by providing the first protruding portions 40a and the second protruding portions 40b at the four corners of the first end surface 12e and the second end surface 12f of the multilayer body 12B, it is possible to improve moisture resistance while reducing or preventing the tombstone phenomenon.

Furthermore, in the multilayer ceramic capacitor 10B according to a preferred embodiment of the present invention, the length WP of each of the first protruding portions 40*a* and the second protruding portions 40*b* in the width direction y is preferably, for example, about 30% or more and about 45% or less of the dimension W of the multilayer body 12B in the width direction y. With such a configuration, it is possible for air existing in the first end surface 12*e* or the second end surface 12*f* of the multilayer body 12B before the first end surface 12*e* or the second end surface 12*f* of the multilayer body 12B is immersed in the electrically conductive paste to be discharged from a region in which the first protruding portion 40*a* and the second protruding portion 40*b* are not provided at portions of the first main surface-side outer layer portion 20*a* and the second main surface-side outer layer portion 20*b*, respectively. Therefore, when the first end surface 12*e* or the second end surface 12*f* of the multilayer body 12B is pulled up from the electrically conductive paste, it is possible to reduce or prevent the remaining of the pores in the electrically conductive paste adhered to the first end surface 12*e* or the second end surface 12*f* of the multilayer body 12B. Furthermore, it is possible to reduce or prevent the generation of pinholes in the external electrodes 30 provided by firing the electrically conductive paste adhered to the first end surface 12*e* or the second end surface 12*f* of the multilayer body 12B.

In the multilayer ceramic capacitor 10B according to a preferred embodiment of the present invention, the length TP of each of the first protruding portion 40*a* and the second protruding portion 40*b* in the height direction x of the multilayer body 12B is preferably, for example, about 30% or more and about 45% or less with respect to the dimension T of the multilayer body 12B in the height direction x. With such a configuration, it is possible for air existing in the first end surface 12*e* or the second end surface 12*f* of the multilayer body 12B before the first end surface 12*e* or the second end surface 12*f* of the multilayer body 12B is immersed in the electrically conductive paste to be discharged from a region in which the first protruding portion 40*a* and the second protruding portion 40*b* are not provided at portions of the first lateral surface-side outer layer portion 22*a* and the second lateral surface-side outer layer portion 22*b*, respectively. Therefore, when the first end surface 12*e* or the second end surface 12*f* of the multilayer body 12B is pulled up from the electrically conductive paste, it is possible to reduce or prevent the remaining of the pores in the electrically conductive paste adhered to the first end surface 12*e* or the second end surface 12*f* of the multilayer body 12B. Furthermore, it is possible to reduce or prevent the generation of pinholes in the external electrodes 30 provided by firing the electrically conductive paste adhered to the first end surface 12*e* or the second end surface 12*f* of the multilayer body 12B.

Further, in the multilayer ceramic capacitor 10B according to a preferred embodiment of the present invention, the length LP of the first protruding portions 40*a* and the second protruding portions 40*b* of the multilayer ceramic capacitor 10B according to the present preferred embodiment in the length direction z of the multilayer body 12B is preferably, for example, about 0.1% or more and about 39% or less with respect to the thickness $L_{TOP}$ of the thickest portion of the base electrode layer 32 in the length direction z. With such a configuration, it is possible to improve moisture resistance and further reduce appearance defects. Furthermore, it is difficult to manufacture the first protruding portions 40*a* and the second protruding portion 40*b* each having a length LP in the length direction z of the multilayer body 12B which is less than about 0.1% with respect to the thickness $L_{TOP}$ of the thickest portion in the length direction of the base electrode layer 32. Furthermore, when the length LP of the first protruding portions 40*a* and the second protruding portions 40*b* in the length direction z of the multilayer body 12B is greater than about 39% with respect to the thickness $L_{TOP}$ of the thickest portion in the length direction of the base electrode layer 32, the first protruding portions 40*a* and the second protruding portions 40*b* are likely to be exposed on the surface of the external electrode 30, and the probability of appearance defects increases.

Further, in the multilayer ceramic capacitor 10B according to a preferred embodiment of the present invention, the surfaces of the first end surface 12*e* and the second end surface 12*f* other than the first protruding portion 40*a* and the second protruding portion 40*b* of the multilayer ceramic capacitor 10B according to the present preferred embodiment preferably have a flat shape. With such a configuration, the thickness at the central portion of the end surface of the base electrode layer 32 increases, such that it is possible to reduce or prevent the tombstone phenomenon generated when the thicknesses of the four corners of the end surface of the base electrode layer 32 are thin.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of laminated dielectric layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of first internal electrode layers on the plurality of dielectric layers and each exposed at the first end surface, and a plurality of second internal electrode layers on the plurality of dielectric layers and each exposed at the second end surface;
    a first external electrode including a base electrode layer on the first end surface and a plated layer on the base electrode layer; and
    a second external electrode including a base electrode layer on the second end surface and a plated layer on the base electrode layer; wherein
    the multilayer body includes:
        an inner layer portion in which the plurality of first internal electrode layers and the plurality of second internal electrode layers are opposed to each other;
        a first main surface-side outer layer portion adjacent to the first main surface and including the plurality of dielectric layers located between the first main surface, and an outermost surface of the inner layer portion adjacent to the first main surface and an extension line of the outermost surface;
        a second main surface-side outer layer portion adjacent to the second main surface and including the plurality of dielectric layers located between the second main surface, and an outermost surface of the inner layer portion adjacent to the second main surface and an extension line of the outermost surface;
        a first lateral surface-side outer layer portion adjacent to the first lateral surface and including the plurality of dielectric layers located between the first lateral surface and an outermost surface of the inner layer portion adjacent to the first lateral surface; and a second lateral surface-side outer layer portion adjacent to the second lateral surface and including the plurality of dielectric layers located between the second lateral surface and an outermost surface of the inner layer portion adjacent to the second lateral surface;

on the first end surface, first protruding portions are opposed to each other and extend along at least two surfaces of the first main surface and the second main surface or the first lateral surface and the second lateral surface at portions where the first main surface-side outer layer portion and the second main surface-side outer layer portion or the first lateral surface-side outer layer portion and the second lateral surface-side outer layer portion are located;

on the second end surface, second protruding portions are opposed to each other and extend along at least two surfaces of the first main surface and the second main surface or the first lateral surface and the second lateral surface at portions where the first main surface-side outer layer portion and the second main surface-side outer layer portion or the first lateral surface-side outer layer portion and the second lateral surface-side outer layer portion are located;

the first protruding portions and the second protruding portions do not overlap the inner layer portion; and a dimension in a shorter direction of a portion of each of the first protruding portions facing the first end surface and a dimension in a shorter direction of a portion of each of the second protruding portions facing the second end surface are about 40% or more and about 80% or less of a dimension in a shorter direction of each of the first main surface-side outer layer portion and the second main surface-side outer layer portion or each of the first lateral surface-side outer layer portion and the second lateral surface-side outer layer portion facing the first end surface or the second end surface.

2. The multilayer ceramic capacitor according to claim 1, wherein a length in a longitudinal direction of a portion of each of the first protruding portions facing the first end surface and a length in a longitudinal direction of a portion of each of the second protruding portions facing the second end surface are equal or substantially equal to a side of the first main surface or the second main surface, and a side of the first lateral surface or the second lateral surface.

3. The multilayer ceramic capacitor according to claim 1, wherein surfaces of the first end surface and the second end surface other than the first protruding portions and the second protruding portions each have a flat shape.

4. The multilayer ceramic capacitor according to claim 1, wherein each of the plurality of dielectric layers includes $BaTiO_3$, $CaTiO_3$, $SrTiO_3$, or $CaZrO_3$ as a main component.

5. The multilayer ceramic capacitor according to claim 4, wherein each of the plurality of dielectric layers includes a Mn compound, an Fe compound, a Cr compound, a Co compound, or a Ni compound as a subcomponent.

6. The multilayer ceramic capacitor according to claim 1, wherein a thickness of each of the plurality of dielectric layers is about 0.5 µm or more and about 10 µm or less.

7. The multilayer ceramic capacitor according to claim 1, wherein each of the plurality of first and second internal electrodes includes Ni, Cu, Ag, Pd, or Au, or an alloy including at least one of Ni, Cu, Ag, Pd, or Au.

8. The multilayer ceramic capacitor according to claim 1, wherein the plated layer of each of the first and second external electrodes includes a Ni plating layer on the base electrode layer and a Sn plating layer on the Ni plating layer.

9. A multilayer ceramic capacitor:
a multilayer body including a plurality of laminated dielectric layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of first internal electrode layers on the plurality of dielectric layers and each exposed at the first end surface, and a plurality of second internal electrode layers on the plurality of dielectric layers and each exposed at the second end surface;

a first external electrode including a base electrode layer on the first end surface and a plated layer on the base electrode layer; and a second external electrode including a base electrode layer on the second end surface and a plated layer on the base electrode layer; wherein the multilayer body includes:
an inner layer portion in which the plurality of first internal electrode layers and the plurality of second internal electrode layers are opposed to each other;

a first main surface-side outer layer portion adjacent to the first main surface and including the plurality of dielectric layers located between the first main surface, and an outermost surface of the inner layer portion adjacent to the first main surface and an extension line of the outermost surface;

a second main surface-side outer layer portion adjacent to the second main surface and including the plurality of dielectric layers located between the second main surface, and an outermost surface of the inner layer portion adjacent to the second main surface and an extension line of the outermost surface;

a first lateral surface-side outer layer portion adjacent to the first lateral surface and including the plurality of dielectric layers located between the first lateral surface and an outermost surface of the inner layer portion adjacent to the first lateral surface; and a second lateral surface-side outer layer portion adjacent to the second lateral surface and including the plurality of dielectric layers located between the second lateral surface and an outermost surface of the inner layer portion adjacent to the second lateral surface;

on the first end surface, first protruding portions are opposed to each other and extend along at least two surfaces of the first main surface and the second main surface or the first lateral surface and the second lateral surface at portions where the first main surface-side outer layer portion and the second main surface-side outer layer portion or the first lateral surface-side outer layer portion and the second lateral surface-side outer layer portion are located;

on the second end surface, second protruding portions are opposed to each other and extend along at least two surfaces of the first main surface and the second main surface or the first lateral surface and the second lateral surface at portions where the first main surface-side outer layer portion and the second main surface-side outer layer portion or the first lateral surface-side outer layer portion and the second lateral surface-side outer layer portion are located;

the first protruding portions and the second protruding portions do not overlap the inner layer portion; and a length of the first protruding portions and the second protruding portions in a length direction of the multilayer body is about 0.1% or more and about 39% or less with respect to a thickness of a thickest portion of the base electrode layer in a length direction.

10. A multilayer ceramic capacitor comprising:

a multilayer body including a plurality of laminated dielectric layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, a plurality of first internal electrode layers on the plurality of dielectric layers and each exposed at the first end surface, and a plurality of second internal electrode layers on the plurality of dielectric layers and each exposed at the second end surface;

a first external electrode including a base electrode layer on the first end surface and a plated layer on the base electrode layer; and a second external electrode including a base electrode layer on the second end surface and a plated layer on the base electrode layer; wherein the multilayer body includes:

an inner layer portion in which the plurality of first internal electrode layers and the plurality of second internal electrode layers are opposed to each other;

a first main surface-side outer layer portion adjacent to the first main surface and including the plurality of dielectric layers located between the first main surface, and an outermost surface of the inner layer portion adjacent to the first main surface and an extension line of the outermost surface;

a second main surface-side outer layer portion adjacent to the second main surface and including the plurality of dielectric layers located between the second main surface, and an outermost surface of the inner layer portion adjacent to the second main surface and an extension line of the outermost surface;

a first lateral surface-side outer layer portion adjacent to the first lateral surface and including the plurality of dielectric layers located between the first lateral surface and an outermost surface of the inner layer portion adjacent to the first lateral surface; and a second lateral surface-side outer layer portion adjacent to the second lateral surface and including the plurality of dielectric layers located between the second lateral surface and an outermost surface of the inner layer portion adjacent to the second lateral surface;

four first protruding portions located at four corners of the multilayer body are provided on the first end surface;

four second protruding portions located at four corners of the multilayer body are provided on the second end surface; and the first protruding portions and the second protruding portions do not overlap the inner layer portion.

11. The multilayer ceramic capacitor according to claim 10, wherein a dimension in the width direction of each of the first protruding portions and the second protruding portions is about 30% or more and about 45% or less of a dimension in the width direction of the multilayer body.

12. The multilayer ceramic capacitor according to claim 10, wherein a dimension in the height direction of each of the first protruding portions and the second protruding portions is about 30% or more and about 45% or less of a dimension in the height direction of the multilayer body.

13. The multilayer ceramic capacitor according to claim 10, wherein a dimension in the length direction of each of the first protruding portions and the second protruding portions is about 0.1% or more and about 39% or less with respect to a thickness of a thickest portion of the base electrode layer in a length direction.

14. The multilayer ceramic capacitor according to claim 10, wherein surfaces of the first end surface and the second end surface other than the first protruding portions and the second protruding portions each have a flat shape.

15. The multilayer ceramic capacitor according to claim 10, wherein each of the plurality of dielectric layers includes $BaTiO_3$, $CaTiO_3$, $SrTiO_3$, or $CaZrO_3$ as a main component.

16. The multilayer ceramic capacitor according to claim 15, wherein each of the plurality of dielectric layers includes a Mn compound, an Fe compound, a Cr compound, a Co compound, or a Ni compound as a subcomponent.

17. The multilayer ceramic capacitor according to claim 10, wherein a thickness of each of the plurality of dielectric layers is about 0.5 μm or more and about 10 μm or less.

18. The multilayer ceramic capacitor according to claim 10, wherein each of the plurality of first and second internal electrodes includes Ni, Cu, Ag, Pd, or Au, or an alloy including at least one of Ni, Cu, Ag, Pd, or Au.

19. The multilayer ceramic capacitor according to claim 10, wherein the plated layer of each of the first and second external electrodes includes a Ni plating layer on the base electrode layer and a Sn plating layer on the Ni plating layer.

* * * * *